United States Patent
Kyogoku et al.

(10) Patent No.: US 11,224,808 B2
(45) Date of Patent: Jan. 18, 2022

(54) GAME SYSTEM, NON-TRANSITORY COMPUTER-READABLE STORAGE MEDIUM HAVING STORED THEREIN GAME PROGRAM, INFORMATION PROCESSING APPARATUS, AND GAME PROCESSING METHOD

(71) Applicant: Nintendo Co., Ltd., Kyoto (JP)

(72) Inventors: Aya Kyogoku, Kyoto (JP); Ken Kato, Kyoto (JP); Yusuke Amano, Kyoto (JP); Hiromichi Miyake, Kyoto (JP); Yoshitaka Takeshita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 33 days.

(21) Appl. No.: 16/749,999

(22) Filed: Jan. 23, 2020

(65) Prior Publication Data

US 2020/0384363 A1     Dec. 10, 2020

(30) Foreign Application Priority Data

Jun. 4, 2019   (JP) .............................. JP2019-104226

(51) Int. Cl.
*A63F 13/525*      (2014.01)
*A63F 13/537*      (2014.01)
*A63F 13/213*      (2014.01)

(52) U.S. Cl.
CPC .......... *A63F 13/525* (2014.09); *A63F 13/213* (2014.09); *A63F 13/537* (2014.09)

(58) Field of Classification Search
CPC .... A63F 13/213; A63F 13/525; A63F 13/537; A63F 13/42; A63F 13/5258
See application file for complete search history.

(56) References Cited

U.S. PATENT DOCUMENTS

| | | | | |
|---|---|---|---|---|
| 6,743,099 B2 * | 6/2004 | Yabe | ........................ | A63F 13/10 463/36 |
| 7,559,834 B1 * | 7/2009 | York | ........................ | A63F 13/10 463/2 |
| 8,556,694 B2 * | 10/2013 | Watanabe | ............. | A63F 13/005 463/8 |

(Continued)

OTHER PUBLICATIONS

"Welcome to Animal Crossing CITY FOLK", Retrieved from the Internet URL: https://www.nintendo.co.jp/wii/ruuj/tsuushin/index.html on Jun. 4, 2019, 3 pages.

(Continued)

*Primary Examiner* — Seng H Lim
(74) *Attorney, Agent, or Firm* — Xsensus LLP

(57) ABSTRACT

In an example of a game system, based on saved data of a plurality of players, a plurality of player characters are generated, and based on an operation on each of a plurality of operation devices, one of the player characters corresponding to the operation device is controlled in a virtual space. The game system can set any of the plurality of player characters as a main character, set the other player character as a sub character, switch the main character and the sub character. Then, the game system controls a field of view of the game so that at least the main character is included in the field of view. The game system generates a game image based on the field of view to be displayed on a display device.

20 Claims, 20 Drawing Sheets

GAME IMAGE IN MULTIPLAY MODE

(56) References Cited

U.S. PATENT DOCUMENTS

| | | | | |
|---|---|---|---|---|
| 2002/0119811 A1* | 8/2002 | Yabe | ................ | A63F 13/10 |
| | | | | 463/8 |
| 2003/0171146 A1* | 9/2003 | Mayer | ................ | A63F 13/812 |
| | | | | 463/37 |
| 2005/0176502 A1* | 8/2005 | Nishimura | ............ | A63F 13/537 |
| | | | | 463/31 |
| 2005/0181849 A1* | 8/2005 | Kobayashi | .............. | A63F 13/10 |
| | | | | 463/7 |
| 2009/0305758 A1* | 12/2009 | Nomura | ................ | A63F 13/822 |
| | | | | 463/7 |
| 2013/0196728 A1* | 8/2013 | Yasue | .................... | A63F 13/56 |
| | | | | 463/8 |
| 2017/0266557 A1* | 9/2017 | Fujiwara | ............... | A63F 13/825 |
| 2020/0254335 A1* | 8/2020 | Taura | .................... | A63F 13/211 |
| 2020/0269129 A1* | 8/2020 | Kira | ........................ | A63F 13/26 |

OTHER PUBLICATIONS

"Welcome to Animal Crossing CITY FOLK", Retrieved from the Internet URL: https://www.nintendo.co.jp/wii/ruuj/tsuushin/index.html on Jun. 4, 2019, and its partial machine translation in English and relevant English site, <http://www.animal-crossing.com/cityfolk/overview/index.html>, 3 pages.

\* cited by examiner

FIG. 9
GAME IMAGE WHEN PLAYER A PLAYS IN SINGLE-PLAY MODE
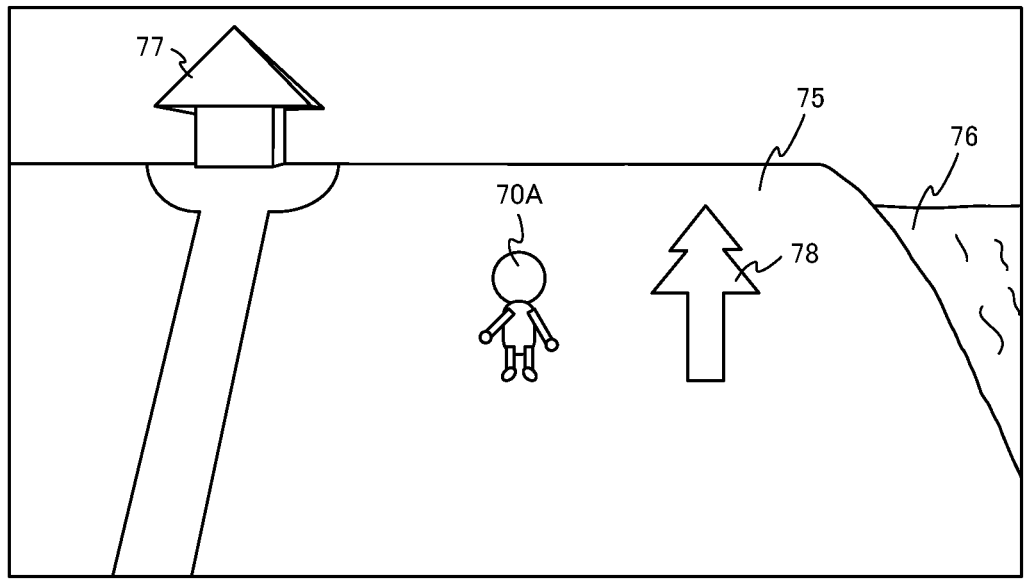
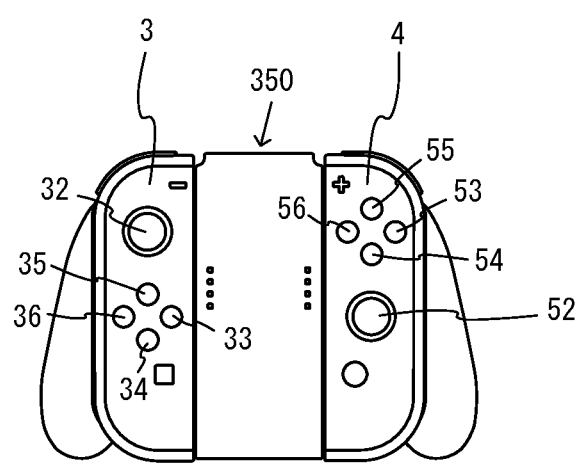
PLAYER A

FIG. 10

KEY ASSIGNMENT IN SINGLE-PLAY MODE

| | | |
|---|---|---|
| LEFT CONTROLLER | ANALOG STICK 32 | MOVEMENT |
| | RIGHT DIRECTION BUTTON 33 | EQUIPMENT MENU |
| | DOWN DIRECTION BUTTON 34 | CHANGE EQUIPMENT |
| | UP DIRECTION BUTTON 35 | CHANGE EQUIPMENT |
| | LEFT DIRECTION BUTTON 36 | STORE AWAY EQUIPMENT |
| RIGHT CONTROLLER | ANALOG STICK 52 | OPERATE VIRTUAL CAMERA |
| | A-BUTTON 53 | BEHAVIOR USING EQUIPMENT |
| | B-BUTTON 54 | DASH |
| | X-BUTTON 55 | VIRTUAL OBJECT MENU |
| | Y-BUTTON 56 | PICK UP |

FIG. 11
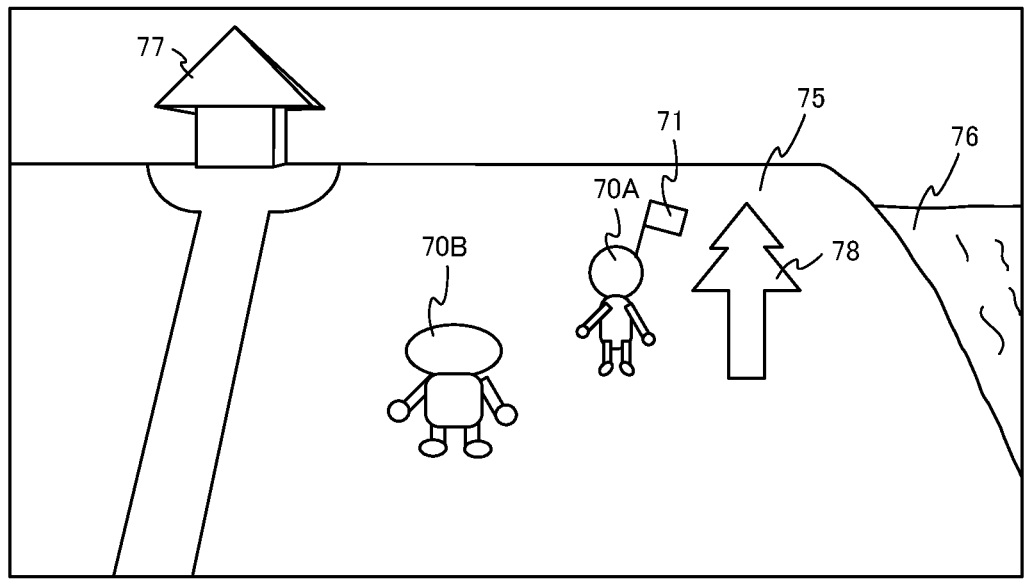
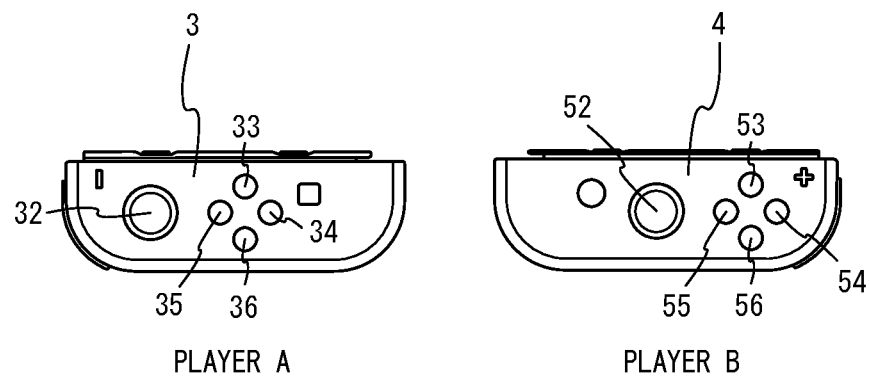

GAME IMAGE IN MULTIPLAY MODE (TELEPORTATION OF SUB CHARACTER)

GAME IMAGE IN MULTIPLAY MODE (MOVEMENT OF SUB CHARACTER)

GAME IMAGE IN MULTIPLAY MODE (MOVEMENT OF SUB CHARACTER)

GAME IMAGE IN MULTIPLAY MODE (EQUIPMENT WITH FISHING ROD)

F I G. 1 8
GAME IMAGE IN MULTIPLAY MODE (SWITCHING OF MAIN CHARACTER)
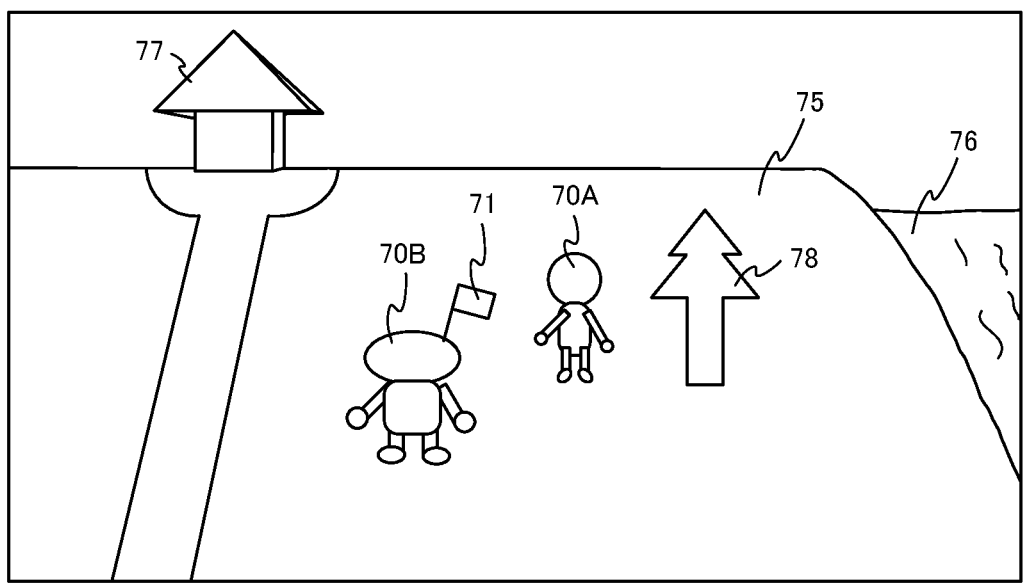

FIG. 19

KEY ASSIGNMENT FOR MAIN CHARACTER IN MULTIPLAY MODE (FIRST MODE)

| LEFT CONTROLLER | ANALOG STICK 32 | MOVEMENT |
|---|---|---|
| | DOWN DIRECTION BUTTON 34 | BEHAVIOR USING EQUIPMENT |
| | LEFT DIRECTION BUTTON 36 | DASH |
| | RIGHT DIRECTION BUTTON 33 | VIRTUAL OBJECT MENU |
| | UP DIRECTION BUTTON 35 | PICK UP |

FIG. 20

KEY ASSIGNMENT FOR MAIN CHARACTER IN MULTIPLAY MODE (SECOND MODE)

| LEFT CONTROLLER | ANALOG STICK 32 | OPERATE VIRTUAL CAMERA |
|---|---|---|
| | DOWN DIRECTION BUTTON 34 | EQUIPMENT MENU |
| | LEFT DIRECTION BUTTON 36 | CHANGE EQUIPMENT |
| | RIGHT DIRECTION BUTTON 33 | CHANGE EQUIPMENT |
| | UP DIRECTION BUTTON 35 | STORE AWAY EQUIPMENT |

FIG. 21

KEY ASSIGNMENT FOR SUB CHARACTER IN MULTIPLAY MODE

| RIGHT CONTROLLER | ANALOG STICK 52 | MOVEMENT |
|---|---|---|
| | X-BUTTON 55 | BEHAVIOR USING EQUIPMENT |
| | A-BUTTON 53 | DASH |
| | Y-BUTTON 56 | — |
| | B-BUTTON 54 | RE-DISPLAY PREDETERMINED IMAGE |

GAME SYSTEM, NON-TRANSITORY COMPUTER-READABLE STORAGE MEDIUM HAVING STORED THEREIN GAME PROGRAM, INFORMATION PROCESSING APPARATUS, AND GAME PROCESSING METHOD

CROSS REFERENCE TO RELATED APPLICATION

The disclosure of Japanese Patent Application No. 2019-104226, filed on Jun. 4, 2019, is incorporated herein by reference.

FIELD

The present disclosure relates to a game system, a game program, an information processing apparatus, and a game processing method that enable a plurality of players to perform a game.

SUMMARY

There is a game where a plurality of players share a single game apparatus, and each player performs the game.

In the above game, however, the plurality of players sharing the single apparatus cannot simultaneously perform the game.

Therefore, it is an object of an exemplary embodiment to provide a game system where a plurality of players sharing a single game system can simultaneously play a game.

To achieve the above object, the exemplary embodiment employs the following configurations.

An example of the exemplary embodiment is a game system including: circuitry configured to read shared data corresponding to a plurality of players of a game from a storage medium; generate a virtual space for the game based on the shared data; read player data corresponding to each of the plurality of players from the storage medium; generate a plurality of player characters in the virtual space based on the player data; set a first player character of the plurality of player characters as a main character and a second player character of the plurality of player characters as a sub-character; control movement of the main character in the virtual space in response to an input received at an operation device corresponding to the main character; control a field of view of the game to be displayed so that at least the main character is included in the field of view; generate a game image based on the field of view of the game to be displayed; control movement of the sub-character in the virtual space in response an input received at an operation device corresponding to the sub-character; switch the first player character from the main character to the sub-character and the second player from the sub-character to the main character in response to an input received at least at one of the operation device corresponding to the main character and the operation device corresponding to the sub-character.

According to this configuration, any of a plurality of player characters is set as a main character, the other player character is set as a sub character, and a game image including at least the main character is generated. Consequently, in a multiplay game performed by a plurality of players, it is possible to perform a game where a main character is a main player character. Further, it is possible to switch the main character and the sub character by an instruction operation. Thus, it is possible to perform the game in a balanced manner while players make an adjustment.

Further, the circuitry may be configured to: select a game play behavior from a plurality of game play behaviors that can be executed by the player characters in response to an input received at the operation device corresponding to the main character; control the main character to perform the selected game play behavior based on an input received at the operation device corresponding to the main character; and control the sub-character to perform the selected game play behavior based on an input received at the second operation device.

According to this configuration, the main character can execute a behavior selected by the main character, and the sub character can also execute the same behavior. Consequently, the plurality of players can share a behavior and play the game with a sense of togetherness.

Further, the circuitry may be configured to: cause one or more of the player characters to acquire a virtual object within the virtual space; and store information indicating that the virtual object has been acquired in player data corresponding to the one or more player characters.

According to this configuration, it is possible to cause a player character to acquire a virtual object in a virtual space and store the virtual object as saved data.

Further, the circuitry may be configured to: select the game play behavior based on an input received at the operation device corresponding to the main character selecting an equipment item to be allocated to the main character; equip the main character with the selected equipment item; and equip the sub-character with the selected equipment item or with an equipment item associated with the selected game play behavior.

According to this configuration, an equipment item and a behavior are associated with each other. By equipping a player character with an equipment item, it is possible to select a behavior that can be executed. For example, by acquiring a new equipment item, it is possible to cause the player character to execute a new behavior. Thus, it is possible to broaden the range of the game.

Further, the circuitry may be configured to control the field of view and/or control the sub-character so that the sub character is included in the field of view.

According to this configuration, it is possible to include both the main character and the sub character in the game image.

Further, the circuitry may be configured to move the sub-character to be included in the field of view in a case that the sub-character has moved out of the field of view.

According to this configuration, even when the sub character is about to come out of the field of view of a virtual camera, it is possible to forcibly move the sub character so that the sub character is included in the field of view of the virtual camera. Thus, it is possible to include both the main character and the sub character in the game image.

Further, the circuitry may be configured to: identify that the sub-character has moved outside of the field of view; and control, in a case that a predetermined time has elapsed from when the sub-character has moved out of the field of view, the sub-character to move into the field of view.

According to this configuration, within a predetermined time after the sub character comes out of the field of view of the virtual camera, the sub character can move and enter the field of view of the virtual camera by itself. When the predetermined time elapses, it is possible to forcibly move the sub character into the field of view of the virtual camera.

Further, the circuitry may be configured to: generate the first player character based on saved data of a first player among the plurality of players and initiate a single-play game process using the first player character; during the single-play game process, in accordance with a start operation, generate the second player character in the virtual space based on saved data of a second player among the plurality of players and perform a multiplay game process using at least the first player character and the second player character such that the first player character is the main character, and the second player character is the sub-character; during the multiplay game process, in accordance with the input received at least at one of the operation device corresponding to the main character and the operation device corresponding to the sub-character, switch the first player character from the main character to the sub-character and the second player character from the sub-character to the main character; and during the multiplay game process, in accordance with an end operation, resume the single-play game process using the second player character as the main character.

According to this configuration, even when a first player starts the game in the single-play mode, and the multiplay game where a first player character is the main character is started during the single-play game, but when a second player character is switched to the main character when the multiplay game is ended, it is possible to resume the single-play game by the second player character.

Further, the virtual space may be generated based on the shared data corresponding to the plurality of players, the storage medium includes a first storage area configured to store the shared data corresponding to the plurality of players and a second storage area divided with respect to the player data corresponding to each of the plurality of players, saved data for generating the virtual space is stored in the first storage area, and saved data for generating the player characters is stored in the second storage area.

According to this configuration, it is possible to separately store saved data shared by the players and saved data with respect to each player.

Further, the circuitry may be configured to: generate one of first and second the player characters based on the player data corresponding to one of the plurality of players; execute a single-play game process using the one of the first and second player characters; during the execution of the single-play game process, perform first game control in accordance with an input received at a first operation device and perform second game control in accordance with an input received at a second operation device; generate a second one of the first and second player characters based on the data corresponding to a second one of the plurality of players, set one of the first and second player characters as the main character, and set the one of the first and second player characters other than the main character as the sub-character, thereby executing a multiplay game process using the first character and the second character; and during the execution of the multiplay game process, in accordance with a switching operation on the first operation device, set an operation mode of the first operation device to a first mode or a second mode, and when the operation mode is the first mode, perform the first game control in accordance with an operation on the first operation device, and when the operation mode is the second mode, perform the second game control in accordance with the operation on the first operation device.

According to this configuration, when the game in the single-play mode is performed, different types of game control are performed using a first operation device and a second operation device. When the game is performed in the multiplay mode, an operation mode of the first operation device is switched, and the same game control as that in the single-play mode can be performed.

Further, another exemplary embodiment may be an information processing apparatus for executing the above processing, a game program for causing a processor of an information processing apparatus to perform the above processing, or a game processing method performed by a game system.

According to the exemplary embodiment, in a multiplay game performed by a plurality of players, it is possible to perform a game where a main character is a main player character, and it is also possible to switch the main character and a sub character. Thus, a plurality of players can perform the game in a balanced manner.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 9 is a diagram showing an example of a game image when a player A performs a game in a single-play mode;

FIG. 10 is a diagram showing an example of the assignment of keys of the left and right controllers in the single-play mode;

FIG. 11 is a diagram showing an example of a game image when the player A and a player B perform a game in a multiplay mode;

FIG. 18 is a diagram showing an example of a game image after the main character is switched from the player character 70A to the player character 70B;

FIG. 19 is a diagram showing an example of the key assignment for the main character in a case where a controller corresponding to the main character is the left controller 3 (a first mode);

FIG. 20 is a diagram showing an example of the key assignment for the main character in a case where the controller corresponding to the main character is the left controller 3 (a second mode);

FIG. 21 is a diagram showing an example of the key assignment for the sub character in a case where the controller corresponding to the sub character is the right controller 4;

DETAILED DESCRIPTION OF NON-LIMITING EXAMPLE EMBODIMENTS (System Configuration) A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
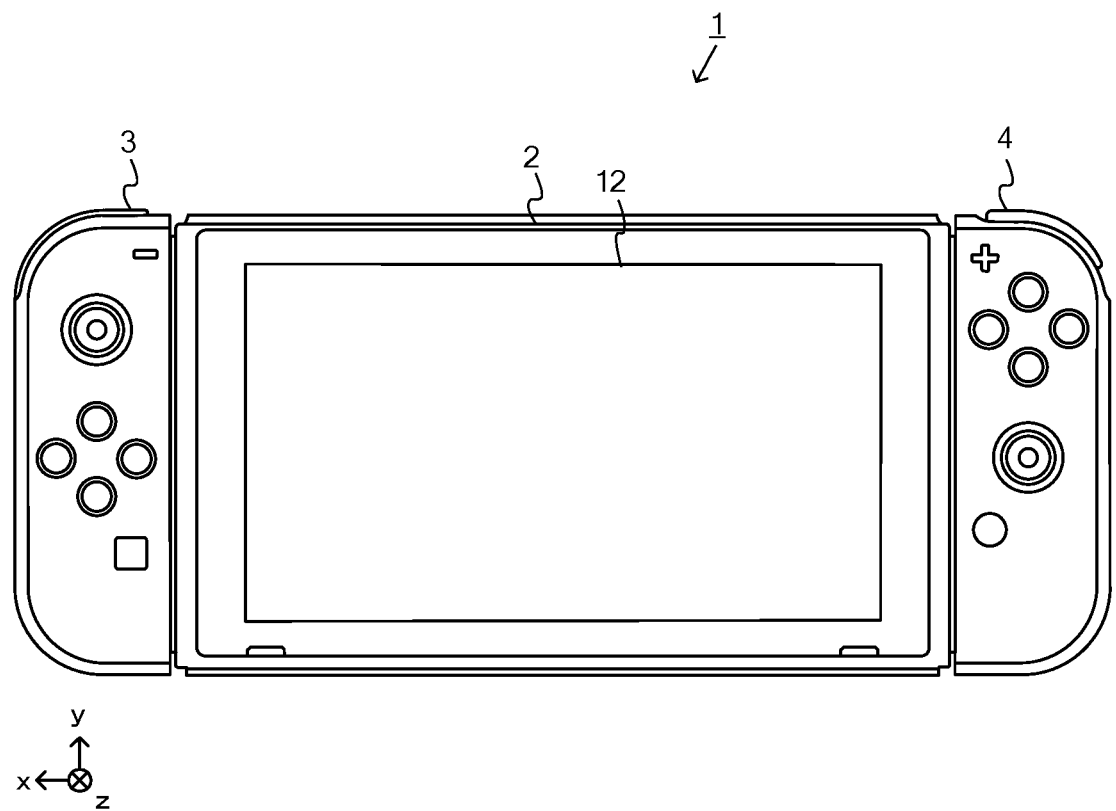
FIG. 1 is a diagram showing an example of the state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
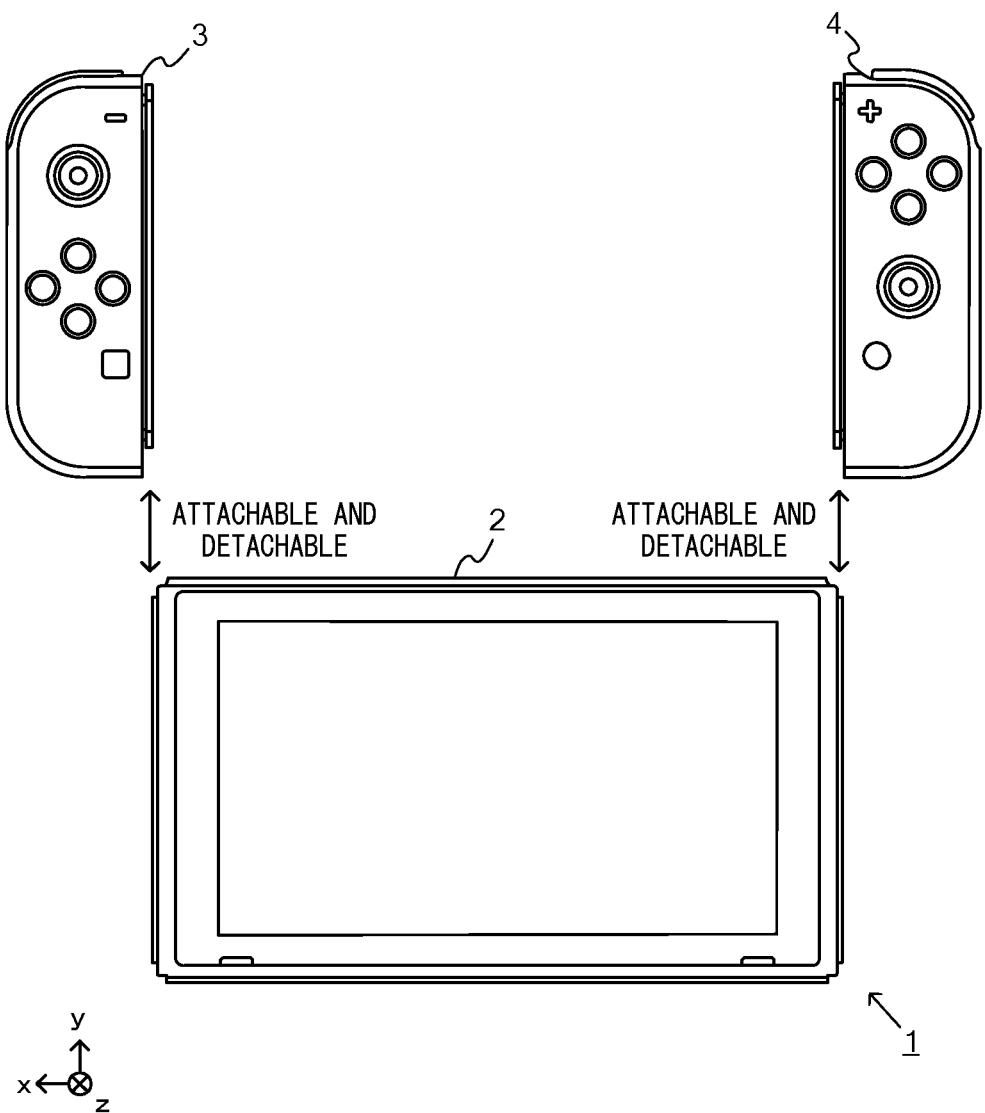
FIG. 2 is a diagram showing an example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
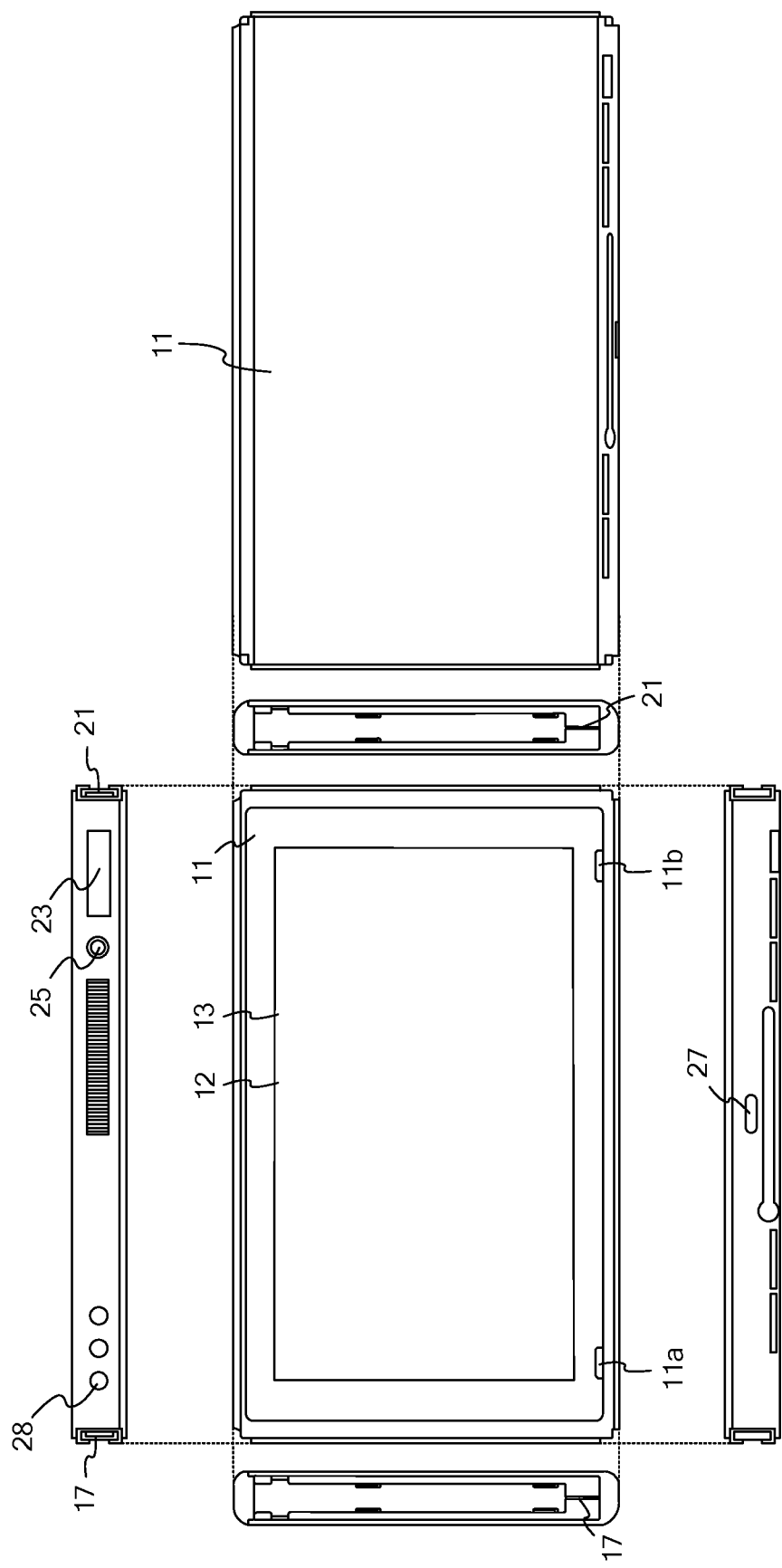
FIG. 3 is six orthogonal views showing an example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
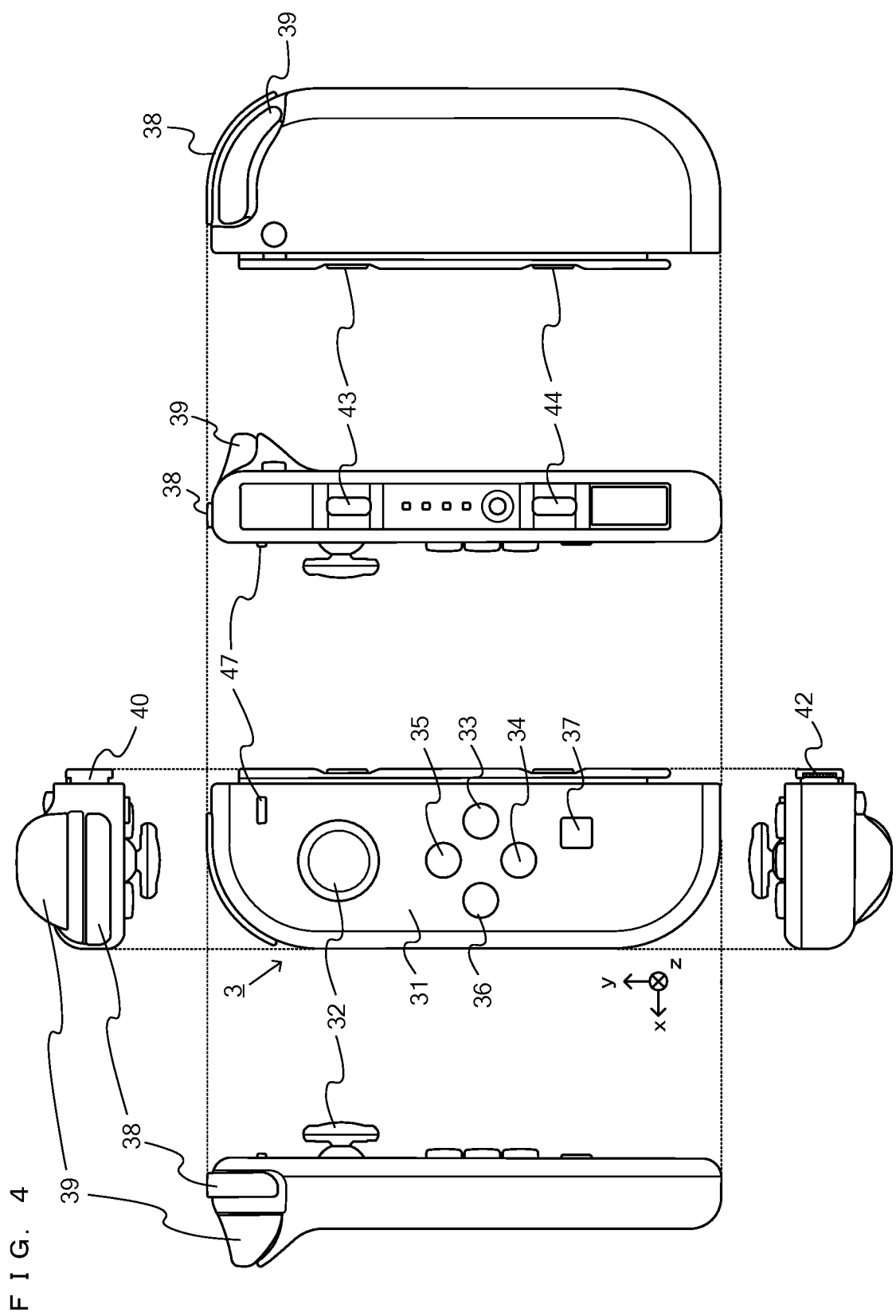
FIG. 4 is six orthogonal views showing an example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
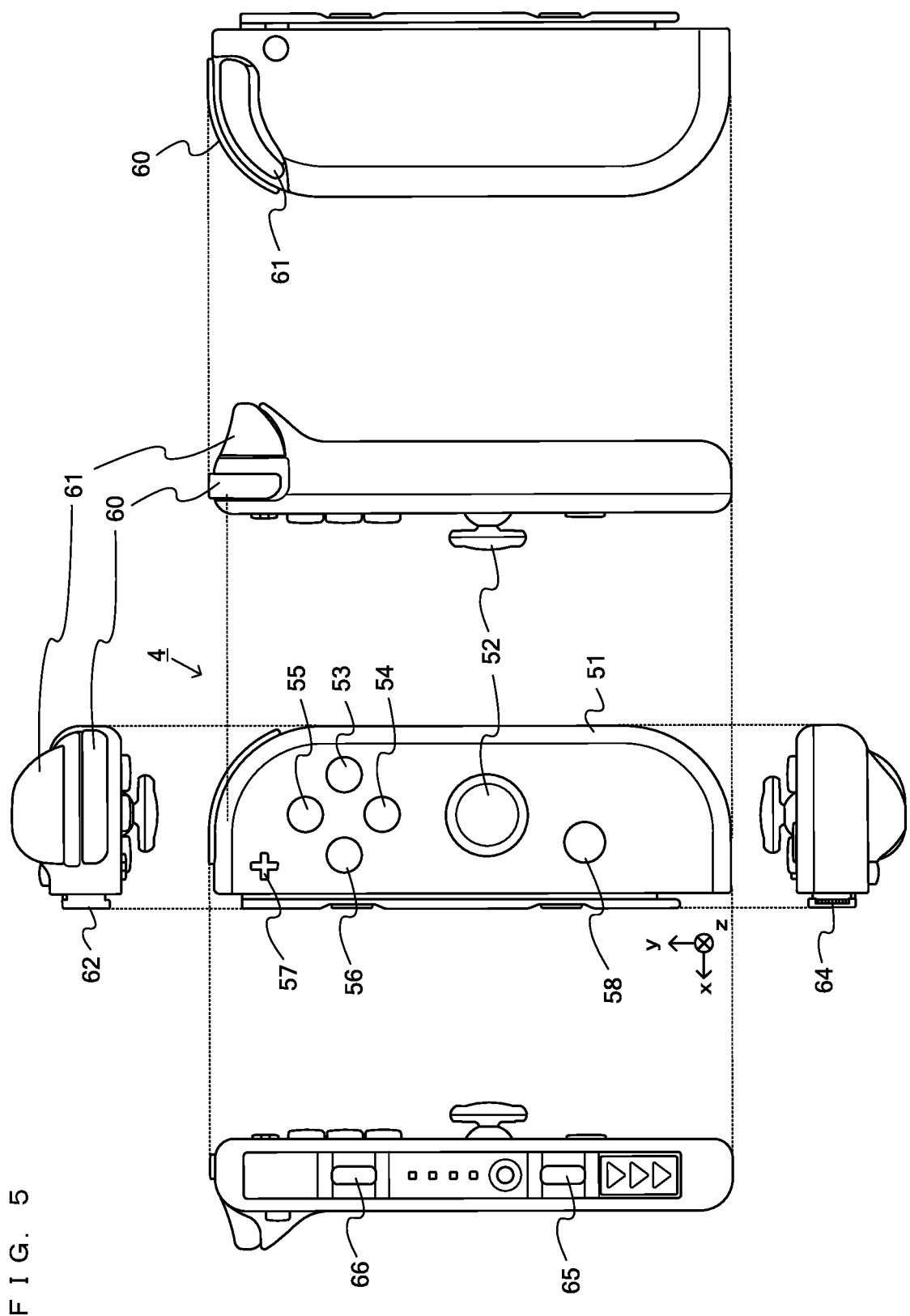
FIG. 5 is six orthogonal views showing an example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
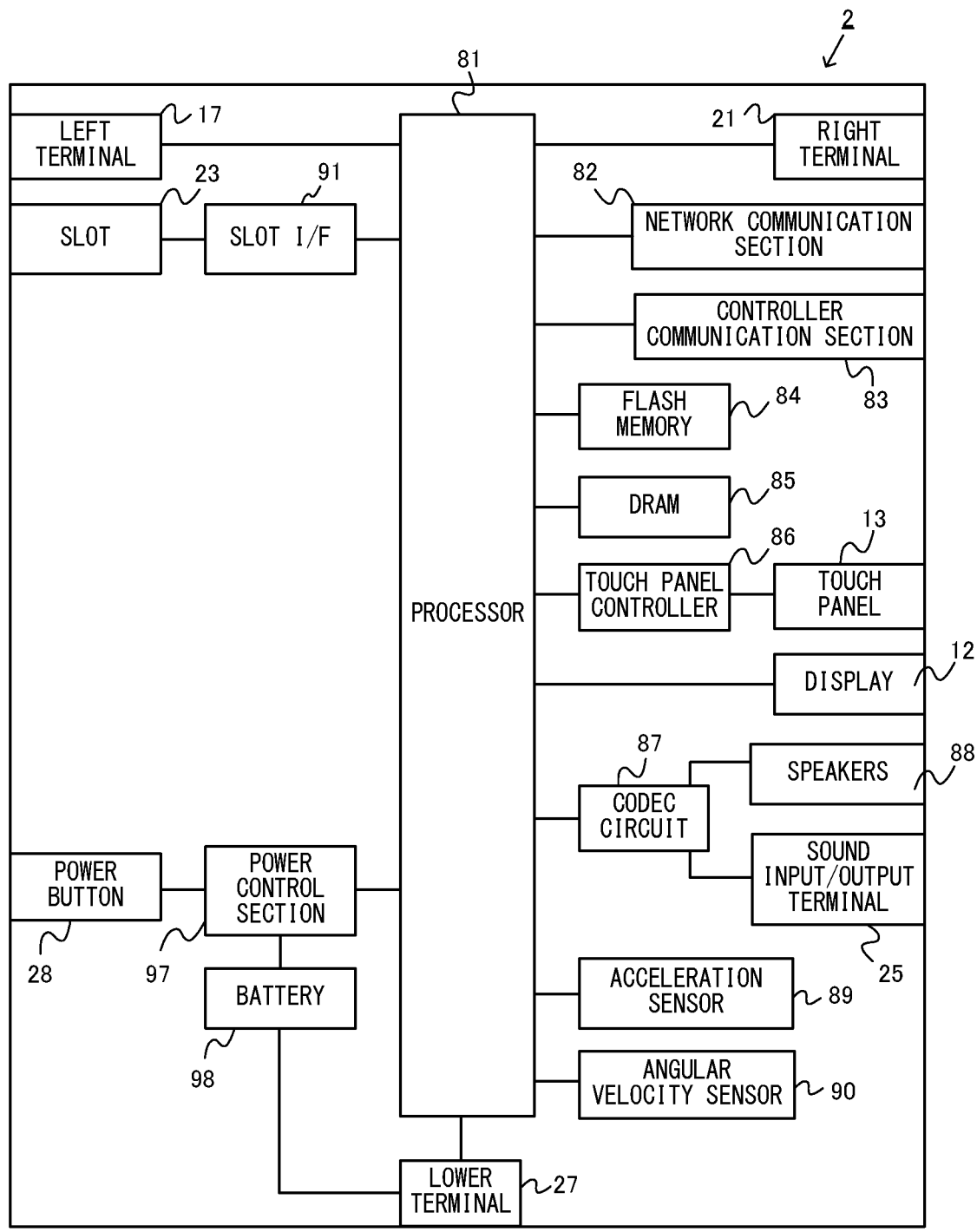
FIG. 6 is a block diagram showing an example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
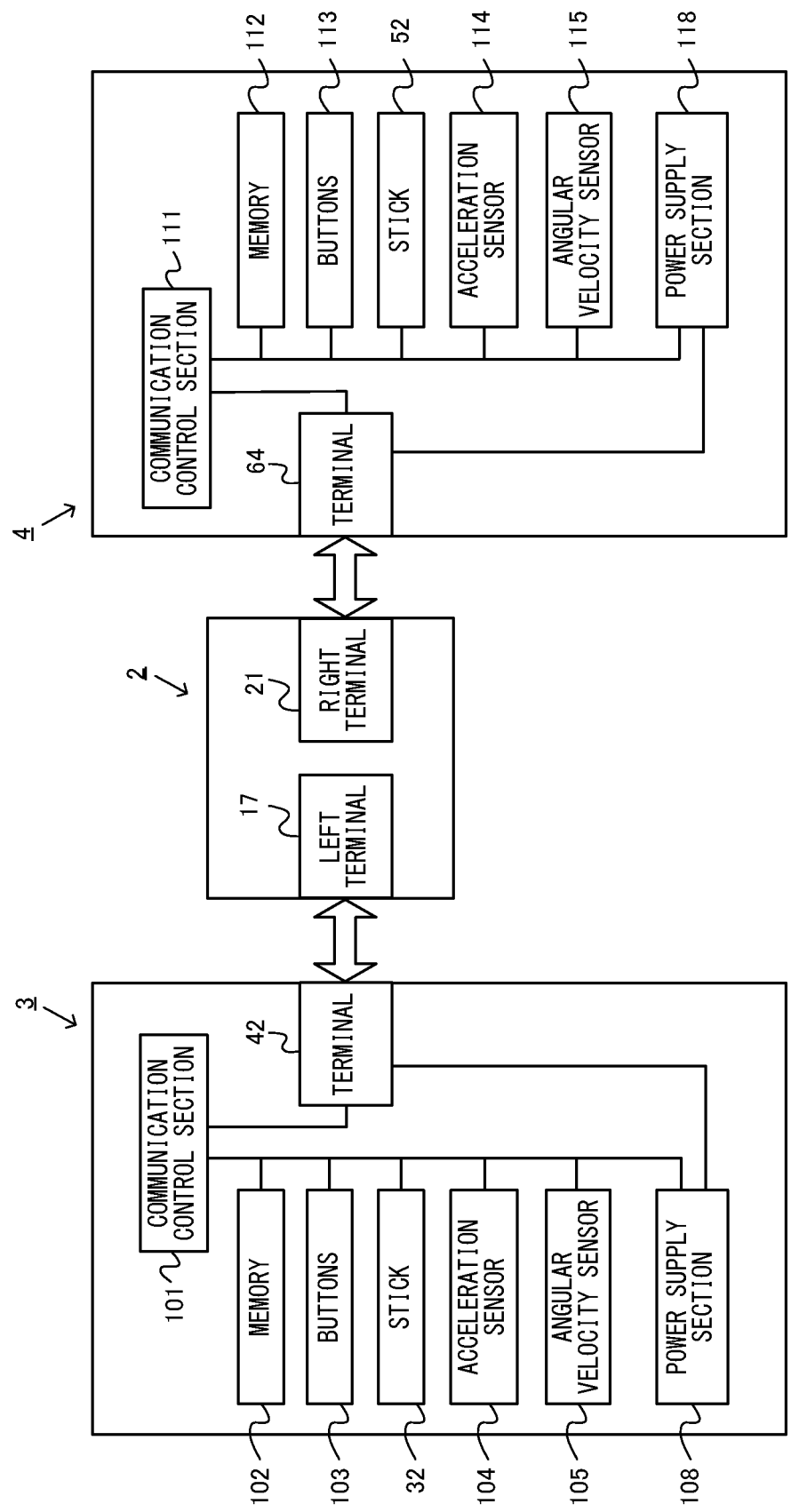
FIG. 7 is a block diagram showing examples of the internal configurations of the main body apparatus 2 and the left controller 3 and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

(Overview of Game According to Exemplary Embodiment)

Next, a description is given of an overview of a game performed by the game system 1. In a game according to the exemplary embodiment, in the main body apparatus 2, a single virtual space termed a "village" is formed. In the village, a player character corresponding to a player is placed. The player performs the game by moving the player character in the virtual space and causing the player character to perform a predetermined behavior (action).

For example, the player character can move in the virtual space and talk to another character (a non-player character controlled by the main body apparatus 2). Further, the player character can customize the virtual space by, as a predetermined behavior, digging in the ground or landing up on the ground, thereby forming a new terrain in the virtual space, or by building a house.

Further, the player character can possess a plurality of equipment items. Examples of the equipment items include a scoop, a fishing rod, an insect net, an axe, and the like. In the state where the player character is equipped with any of the plurality of equipment items possessed by the player character, the player character performs a behavior corresponding to the equipment item. For example, the player character can be equipped with an axe, and in the state where the player character is equipped with the axe, the player character can cut a tree object in the virtual space and acquire a wood. Further, the player character can be equipped with the fishing rod as an equipment item and fish in a river or a sea in the virtual space. Further, the player character can be equipped with the insect net as an equipment item and collect insects using the insect net. When the player character cuts a tree, catches a fish, or catches an insect, a virtual object such as an acquired wood, fish, insect, or the like can be stored as the player character's possession. Further, even when the player character is not equipped with an equipment item, the player character can pick up a virtual object lying on the ground of the virtual space and possess the virtual object.

It should be noted that the player character can also exchange an acquired virtual object for an equipment item, or create an equipment item from an acquired virtual object.

Data regarding an equipment item and a virtual object (an acquired wood, fish, insect, or the like) possessed by the player character is stored as "player saved data". Further, when the player character forms a new terrain or builds a house in the virtual space (the village), the state of the virtual space changes, and data regarding the state of the virtual space is stored as "shared saved data".

The "shared saved data" and the "player saved data" are stored in the flash memory 84 of the main body apparatus 2. When the player ends the game once and resumes the game, the "shared saved data" and the "player saved data" stored in the flash memory 84 are read. Consequently, the game can be resumed from a state stored as saved data.

The "shared saved data" and the "player saved data" are updated at a predetermined timing during the game. For example, when the player character newly acquires an equipment item, or acquires a virtual object such as a fish, data regarding the acquired equipment item or virtual object is stored as the player saved data in the flash memory 84 at the timing when the equipment item or the virtual object is acquired. Further, when the state of the virtual space changes by the player character picking up a virtual object lying in the virtual space or digging a hole in the virtual space, data indicating the state of the virtual space is stored as the shared saved data in the flash memory 84 at the timing when the state of the virtual space changes. It should be noted that the timing when the player saved data or the shared saved data is stored as saved data in the flash memory 84 may be any timing. For example, when the state of the virtual space changes during the game, or when the state of the player character changes (e.g., the player character's possession changes), the state of the change may be temporarily stored in the DRAM 85. At the timing when the game ends, or the timing when the scene in the game changes, the state of the end or the change may be saved as saved data in the flash memory 84. Further, in accordance with an instruction from the player, information temporarily stored in the DRAM 85 may be saved as saved data in the flash memory 84.

There are cases where the game system 1 is used by a single player and where the game system 1 is used in common by a plurality of players such as a family. When a single player performs the above game using the game system 1, a single piece of "shared saved data" and a single piece of "player saved data" are stored in the main body apparatus 2. In this case, a single player character is present in the virtual space.

When a plurality of players perform the above game using the game system 1 in common, a single piece of "shared saved data" and pieces of "player saved data" corresponding to the plurality of players are stored in the main body apparatus 2. In this case, in the virtual space formed based on the "shared saved data", all the players play the game. That is, each player moves their player character in the same virtual space, or causes their player character to perform a predetermined behavior.

Figure 8:
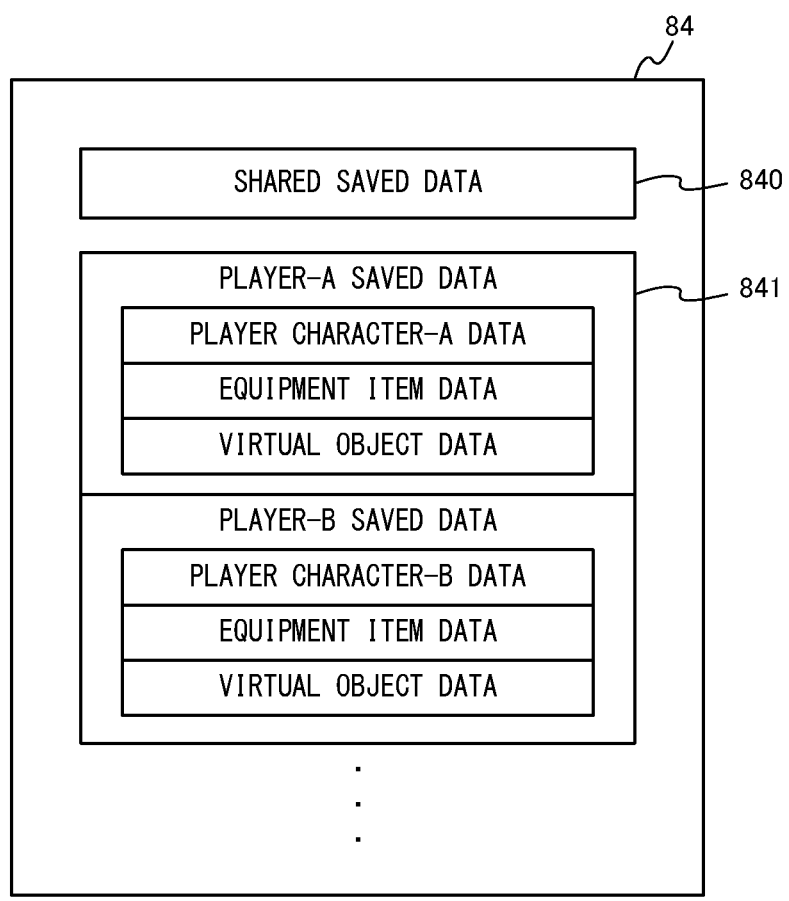
FIG. 8 is a diagram showing an example of saved data stored in the main body apparatus 2 of a game system 1.

FIG. 8 is a diagram showing an example of saved data stored in the main body apparatus 2 of the game system 1. As shown in FIG. 8, in the flash memory 84 of the main body apparatus 2, a shared saved data area 840 and a player saved data area 841 are provided. In the shared saved data area 840, a single piece of "shared saved data" is stored. The "shared saved data" is data regarding the virtual space and includes data regarding an object placed in the virtual space, such as a terrain, a house, or a wood (e.g., data regarding the shape, the position, and the like of the object). The "shared saved data" is data shared by a plurality of players.

In the player saved data area 841, one or more pieces of player saved data are stored. For example, suppose that in the main body apparatus 2, the accounts of a player A and a player B are registered, and the player A and the player B play the game according to the exemplary embodiment. In this case, player-A saved data and player-B saved data are stored as pieces of player saved data. It should be noted that in the exemplary embodiment, the main body apparatus 2 can store up to eight pieces of player saved data, for example.

Each piece of player saved data includes player character data, equipment item data, and virtual object data. The player character data is data regarding the name, the face, the habitus, the clothing, and the like of a player character. When starting the game according to the exemplary embodiment, a player creates their player character. The created player character is stored as saved data of the player in the flash memory 84. Further, the equipment item data is data indicating one or more equipment items (e.g., a scoop, a fishing rod, an insect net, an axe, and the like) possessed by the player character. Further, the virtual object data is data regarding a virtual object acquired by the player character using an equipment item during the game and is data regarding a virtual object such as the fish, the insect, or the wood.

In the exemplary embodiment, even when a plurality of players use the game system 1 in common, basically, a single player performs the game using the left and right controllers in the state where the left and right controllers are attached to the main body apparatus 2 (FIG. 1) or the state where the left and right controllers are separated from the main body apparatus 2. That is, basically, each player plays the game in a single-play mode. In the single-play mode, for example, when the player A plays the game, a player other than the player A does not play the game.

FIG. 9 is a diagram showing an example of a game image when the player A performs the game in the single-play mode.

The player A performs the game using the left controller 3 and the right controller 4. For example, the player A may perform the game by attaching the left controller 3 and the right controller 4 to the main body apparatus 2. In this case, the player A performs the game while viewing a game image displayed on the display 12. Further, as shown in FIG. 9, the player A may perform the game by detaching the left controller 3 and the right controller 4 from the main body apparatus 2 and fixing the left controller 3 and the right controller 4 to a fixed apparatus 350. In this case, the player A performs the game while viewing a game image displayed on the display 12 or the stationary monitor.

When the player A starts the game, the shared saved data and the player-A saved data are read from the main body apparatus 2. For example, as shown in FIG. 9, a ground object 75 is placed in the virtual space, and a tree object 78 is placed on the ground object 75. Further, a river object 76 is placed in the virtual space. The objects forming the virtual space are generated based on the shared saved data.

Further, a player character 70A corresponding to the player A is placed on the ground object 75. The player character 70A is generated based on the player-A saved data. The player character 70A is a character created (customized) by the player A and is controlled in accordance with an operation of the player A on the left and right controllers. When the player A plays the game in the single-play mode, only the player character 70A appears as a player character in the virtual space. It should be noted that during the game in the single-play mode by the player A, another character (a non-player character) controlled by the main body apparatus 2 may appear in the virtual space.

By operating the left controller 3 and the right controller 4, the player A moves the player character 70A in the virtual space or causes the player character 70A to perform a predetermined behavior (action). In the single-play mode, a virtual camera placed in the virtual space is set at a predetermined position behind a player character, and the virtual camera also moves in accordance with the movement of the player character.

A description is given below of an example of an operation using the left and right controllers in the single-play mode.

FIG. 10 is a diagram showing an example of the assignment of keys of the left and right controllers in the single-play mode. As shown in FIG. 10, for example, the analog stick 32 of the left controller 3 is used to specify the moving direction of a player character. Further, the right direction button 33 of the left controller 3 is used to display an equipment item menu. The equipment item menu displays a list of equipment items possessed by the player character and is used to select an equipment item from the list. Further, the down direction button 34 and the up direction button 35 of the left controller 3 are used to change an equipment item with which the player character is equipped. When the down direction button 34 or the up direction button 35 is pressed, an equipment item with which the player character is equipped is changed in order. Further, the left direction button 36 of the left controller 3 is used to store away an equipment item (so that the player character is not equipped with the equipment item).

Further, the analog stick 52 of the right controller 4 is used to control the position and the orientation of the virtual camera. For example, the virtual camera is configured to, in accordance with an operation on the analog stick 52, move in the up direction of the virtual space with the player character at the center while being directed to the player character. Even when the position and the orientation of the virtual camera are changed, the player character is present in the field of view of the virtual camera.

The A-button 53 of the right controller 4 is used to cause the player character to perform a behavior corresponding to an equipment item. Further, the B-button 54 of the right controller 4 is used to cause the player character to dash. When the analog stick 32 is tilted while the B-button 54 is pressed, the player character moves dashing in the tilt direction of the analog stick 32. When the analog stick 32 is tilted in the state where the B-button 54 is not pressed, the player character moves walking in the tilt direction of the analog stick 32. Further, the X-button 55 of the right controller 4 is used to display a virtual object menu. The virtual object menu is used to display a list of virtual objects acquired by the player character during the game (an acquired fish, insect, wood, or the like), select a virtual object, or exchange a selected virtual object for another object (e.g., an equipment item). Further, the Y-button 56 of the right controller 4 is used to cause the player character to perform the action of picking up a virtual object lying in the virtual space.

It should be noted that the key assignment shown in FIG. 10 is merely an example, and the assignment of the keys of the left and right controllers and game control corresponding to the keys may be appropriately changed.

For example, when the player A performs the game in the virtual space, and the state of the virtual space changes, this state is stored as the shared saved data in the main body apparatus 2. For example, when the player A constructs a house object 77 at a predetermined position in the virtual space during the game, information regarding the house object 77 is stored as the shared saved data.

After the player A ends the game, for example, the player B can start the game using the game system 1. At this time, the shared saved data and the player-B saved data stored in the main body apparatus 2 are read. When the shared saved data and the player-B saved data are read, a player character 70B corresponding to the player B appears in the virtual space. Consequently, in the state of the virtual space when the player A ends the game, the game by the player B is started. A case where the player B plays the game in the single-play mode is similar to the above.

(Multiplay Mode)

In the game according to the exemplary embodiment, basically, each player plays the game in the single-play mode using the game system 1. However, a plurality of players can also perform the game in a multiplay mode where the plurality of players simultaneously perform the game.

For example, when the player A plays the game in the single-play mode, it is possible to call a player character of another player by a predetermined operation of the player A. For example, when the player A performs the operation of calling the player B while playing the game, the player character 70B of the player B is added to the virtual space. The player A passes the player B, for example, the right controller 4 between the left and right controllers used by the player A themselves during the single-play. In the multiplay mode after that, the player A operates the player character 70A of the player A themselves using the left controller 3, and the player B operates the player character 70B of the player B themselves using the right controller 4.

FIG. 11 is a diagram showing an example of a game image when the players A and B perform the game in the multiplay mode.

Also in the multiplay mode, similarly to the single-play mode, a game image in which the virtual space is viewed from a single virtual camera is generated, and the game image is displayed on a single screen. In the multiplay mode, one of a plurality of player characters currently present in the virtual space is set as a main character, and the other player character is set as a sub character. Specifically, initially, one of the player characters that has called the other player character is set as the main character, and the called player character is set as the sub character.

For example, when the player A calls the player character 70B corresponding to the player B while playing the game in the single-play mode, the player character 70A corresponding to the player A is set as a main character, and the player character 70B corresponding to the player B is set as a sub character. When a player character 70C corresponding to a player C is further called, the player character 70C is also set as a sub character.

To the player character 70A as the main character, a flag object 71 indicating that the player character 70A is currently set as the main character is added.

The player A can perform, on the player character 70A as the main character, an operation similar to an operation in the single-play mode. That is, the player A can move the player character 70A (cause the player character 70A to walk or dash) in the virtual space or cause the player character 70A to perform a predetermined behavior using an equipment item. Further, the player A can select an equipment item with which the player character 70A is to be equipped, or pick up a thing lying on the virtual space. Further, the player A can also control the virtual camera. It should be noted that the key assignment in the multiplay mode will be described below.

Further, the player B can move the player character 70B as the sub character (cause the player character 70B to walk or dash) in the virtual space or cause the player character 70B to perform a predetermined behavior using an equipment item. However, an operation on the sub character is limited. For example, the player B cannot select an equipment item with which the player character 70B as the sub character is to be equipped. Further, the movement range of the player character 70B is limited. A description is given below of control of the main character and the sub character in the multiplay mode.

Figure 12:
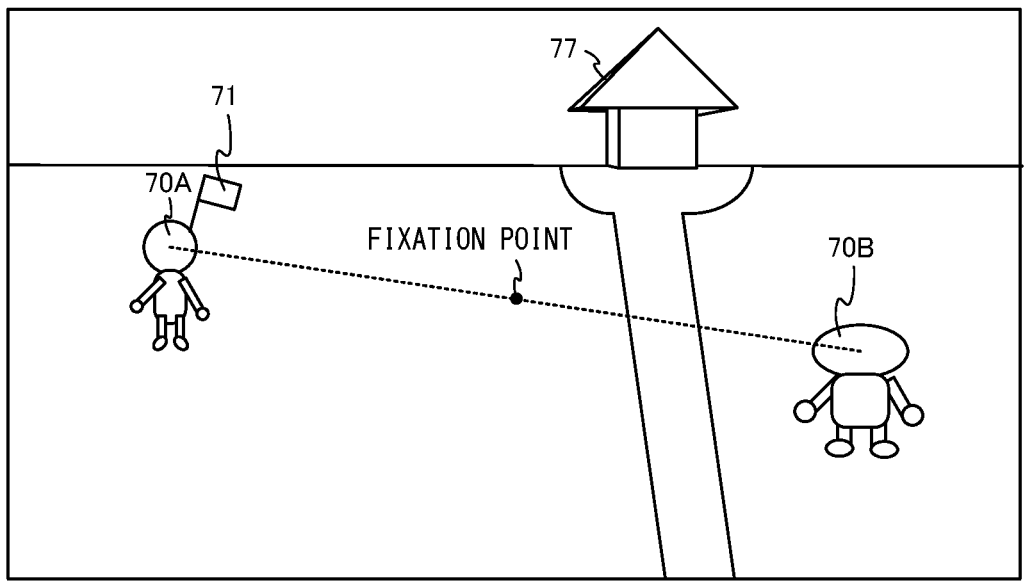
FIG. 12 is a diagram showing an example of a game image after a player character 70A as a main character moves in the left direction of a virtual space in the state shown in FIG. 11.

FIG. 12 is a diagram showing an example of a game image after the player character 70A as the main character moves in the left direction of the virtual space in the state shown in FIG. 11.

When the player character 70A as the main character moves in the left direction of the virtual space as shown in FIG. 12, the virtual camera is controlled so that the main character is included in the field of view of the virtual camera. When the distance between the main character and the sub character is a predetermined distance or less, the virtual camera is controlled so that both the main character and the sub character are included in the field of view of the virtual camera. Specifically, the fixation point of the virtual camera is set at the midpoint (the center position) between the main character and the sub character, and the virtual camera is moved so that the main character is included in the field of view of the virtual camera. It should be noted that when a plurality of sub characters are present in the virtual space, the fixation point of the virtual camera is set at the center position between the main character and the plurality of sub characters. The center position between the main character and the plurality of sub characters is calculated based on the coordinate value of each player character.

Figure 13:
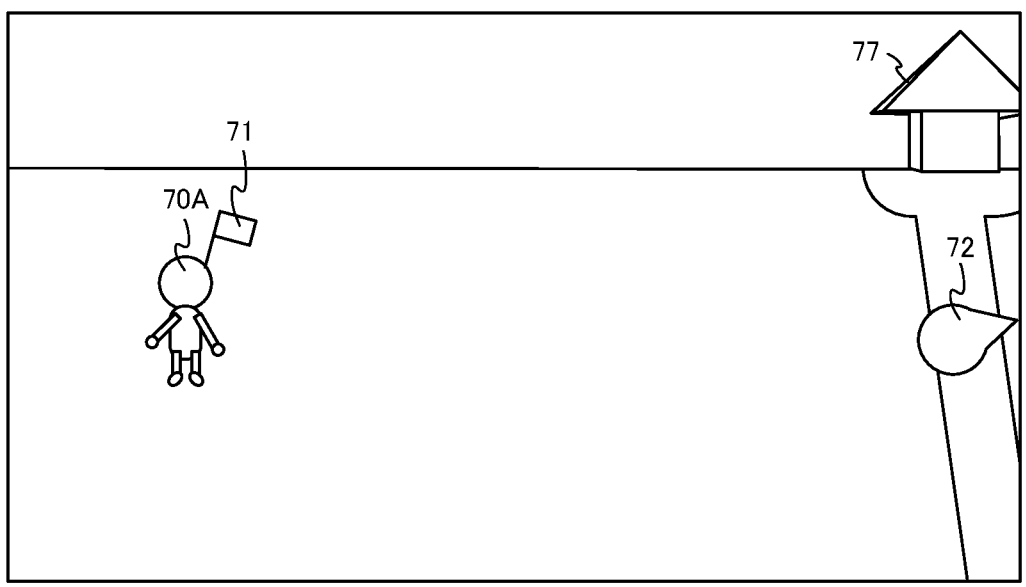
FIG. 13 is a diagram showing an example of a game image after the player character 70A further moves in the left direction in the state shown in FIG. 12.

FIG. 13 is a diagram showing an example of a game image after the player character 70A further moves in the left direction in the state shown in FIG. 12.

As shown in FIG. 13, when the main character further moves in the left direction in the state shown in FIG. 12, the virtual camera moves in the left direction of the virtual space so that the main character is included in the field of view of the virtual camera. That is, the virtual camera moves by following the main character so that the main character is always included in the field of view of the virtual camera. The method for determining the position of the virtual camera may be any method so long as the main character is always included in the field of view of the virtual camera. For example, when the fixation point of the virtual camera is set at the center position between the main character and the sub character, it may be determined whether or not the main character is included in the field of view of the virtual camera. When the main character is not included in the field of view of the virtual camera, the fixation point of the virtual camera may be set on the main character side so that the distance between the fixation point of the virtual camera and the main character is a predetermined distance or less. Further, the center position between the main character and the sub character may be calculated, and it may be determined whether or not the center position is a predetermined distance or more away from the main character. When the center position is the predetermined distance or more away from the main character, the fixation point of the virtual camera may be set on the main character side so that the distance between the fixation point of the virtual camera and the main character is the predetermined distance or less.

On the other hand, regarding the sub character, the distance from the main character becomes greater than or equal to a predetermined distance, and the player character 70B as the sub character comes out of the field of view of the virtual camera. When the player character 70B comes out of the field of view of the virtual camera, as shown in FIG. 13, a position suggestion image 72 suggesting the position of the player character 70B is displayed. In a direction indicated by the position suggestion image 72, the player character 70B is present. The position suggestion image 72 may include an image representing the player character 70B. When a predetermined time (e.g., 5 seconds) elapses after the player character 70B as the sub character comes out of the field of view of the virtual camera, the player character 70B instantaneously moves (warps) to a predetermined position in the field of view of the virtual camera.

Figure 14:
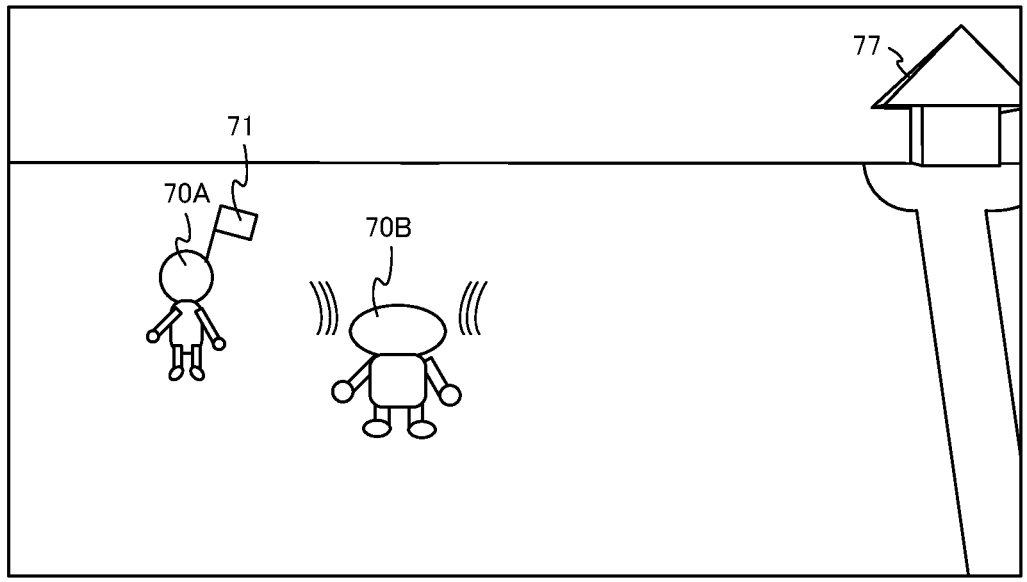
FIG. 14 is a diagram showing an example of a game image when a player character 70B as a sub character comes out of the field of view of a virtual camera and then warps into the field of view of the virtual camera.

FIG. 14 is a diagram showing an example of a game image when the player character 70B as the sub character comes out of the field of view of the virtual camera and then warps into the field of view of the virtual camera.

As shown in FIG. 14, when the predetermined time elapses after the sub character comes out of the field of view of the virtual camera, the sub character instantaneously moves into the field of view of the virtual camera (near the main character). After the game image shown in FIG. 14, the fixation point of the virtual camera is set at the midpoint between the main character and the sub character.

It should be noted that from when the sub character comes out of the field of view of the virtual camera to when the predetermined time elapses, the sub character can move in accordance with an operation of the player. When the player indicates a direction toward the inside of the field of view of the virtual camera, the sub character returns itself to the field of view of the virtual camera.

As described above, in the multiplay mode, the main character can freely move in the virtual space similarly to the single-play mode, and the virtual camera also moves by following the movement of the main character. The virtual camera moves so that the main character and the sub character are included in the field of view of the virtual camera. When the sub character is not included in the field of view as a result of the movement of the virtual camera, priority is given to the main character, and the virtual camera is controlled so that the main character is included in the field of view. When the sub character comes out of the field of view of the virtual camera, the sub character moves so that the sub character is included in the field of view of the virtual camera.

Figure 15:
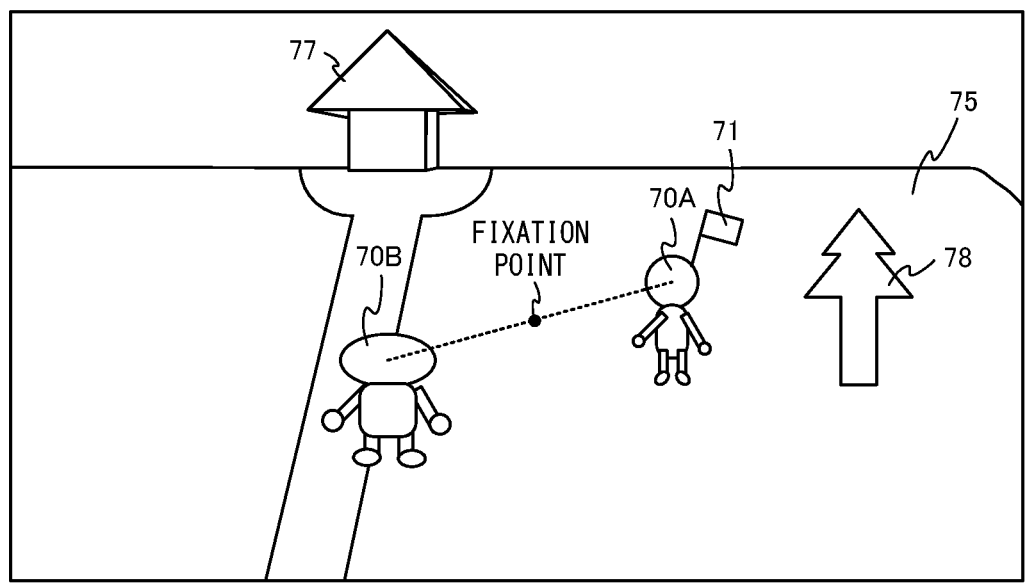
FIG. 15 is a diagram showing an example of a game image after the player character 70B as the sub character moves in the left direction of the virtual space in the state shown in FIG. 11.

Next, a description is given of the movement of the sub character. FIG. 15 is a diagram showing an example of a game image after the player character 70B as the sub character moves in the left direction of the virtual space in the state shown in FIG. 11.

As shown in FIG. 15, when the player B inputs the left direction of the analog stick 52 in the state shown in FIG. 11, the player character 70B as the sub character moves in the virtual space. Also when the sub character moves in the virtual space, and when the distance between the main character and the sub character is the predetermined distance or less, the virtual camera is controlled so that the fixation point of the virtual camera is located at the midpoint between the main character and the sub character. If FIGS. 11 and 15 are compared, it is understood that the house object 77 moves in the right direction of the screen, and the virtual camera moves in the left direction in the virtual space.

When the player B inputs the left direction of the analog stick 52 in the state shown in FIG. 15, and the sub character further moves in the left direction, the virtual camera also moves in the left direction in accordance with the movement of the sub character.

Figure 16:
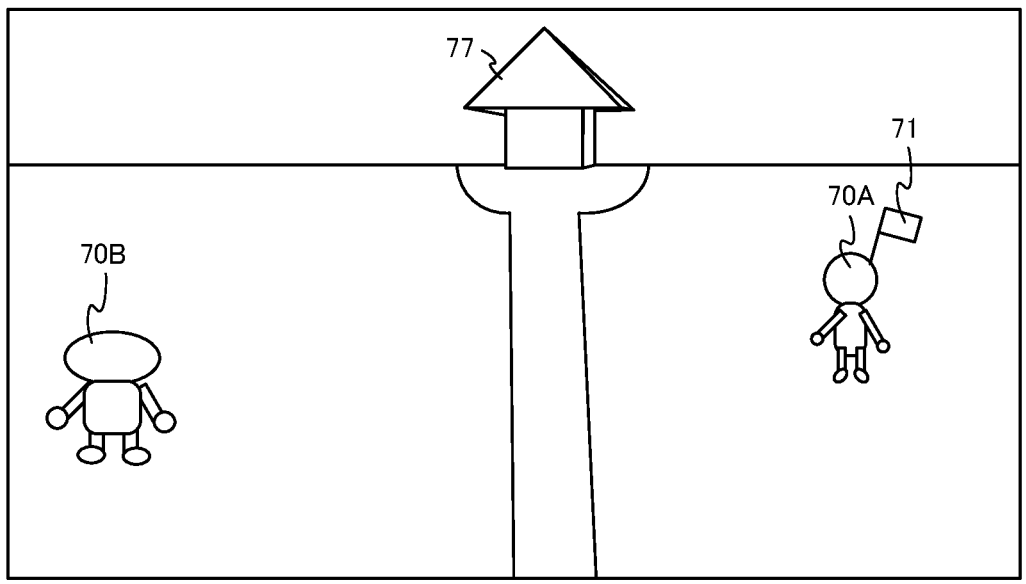
FIG. 16 is a diagram showing an example of a game image after the sub character further moves in the left direction in the state shown in FIG. 15.

FIG. 16 is a diagram showing an example of a game image after the sub character further moves in the left direction in the state shown in FIG. 15. As shown in FIG. 16, when the sub character moves to the left end of the screen, and even when the player B further inputs the left direction, the sub character does not move any further in the left direction. Further, the virtual camera does not move any further in the left direction, either. That is, when the sub character is displayed at the end of the screen, and even when the direction in which the sub character is to come out of the screen is input, the sub character does not move any further.

That is, the sub character does not move out of the field of view of the virtual camera by an operation on the sub character. As shown in FIG. 13, however, the sub character may move out of the field of view of the virtual camera by an operation on the main character.

Figure 17:
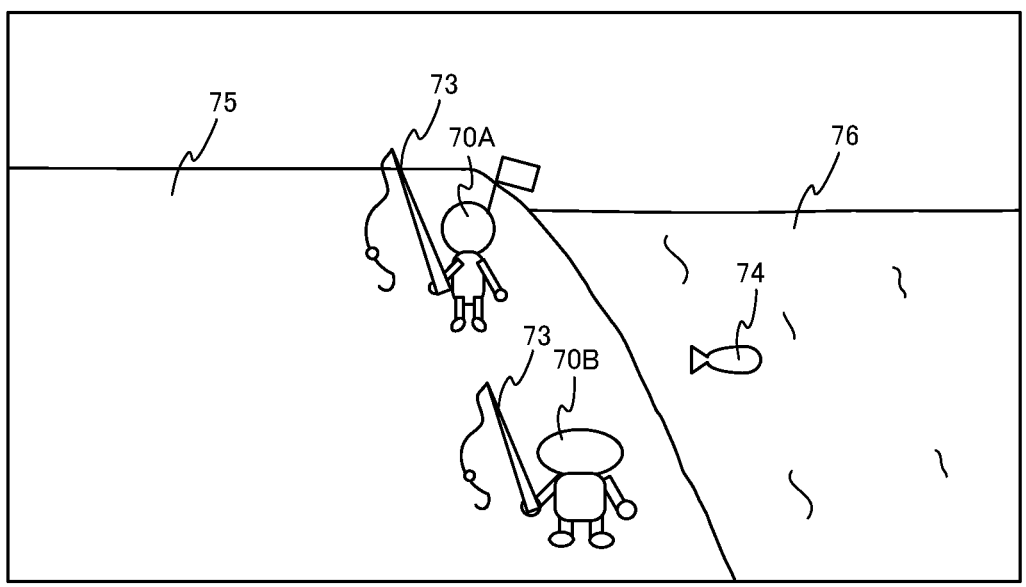
FIG. 17 is a diagram showing an example of the state where the main character and the sub character are equipped with a fishing rod as an equipment item.

Next, a description is given of the process in which the main character and the sub character are equipped with an equipment item and perform behaviors corresponding to the equipment item. FIG. 17 is a diagram showing an example of the state where the main character and the sub character are equipped with a fishing rod as an equipment item.

The player character 70A as the main character possesses a plurality of equipment items and possesses a fishing rod 73 as one of the plurality of equipment items. When, using the left controller 3, the player A performs the operation of selecting the fishing rod 73, the player character 70A is equipped with the fishing rod 73. The equipment of the fishing rod 73 results in the selection of a behavior corresponding to the fishing rod 73 (fishing). When the player character 70A is equipped with the fishing rod 73, the player character 70B as the sub character is also equipped with the same fishing rod 73.

Specifically, when the player character 70B possesses a fishing rod, in accordance with the equipment of the player character 70A with the fishing rod 73, the player character 70B is also equipped with the same fishing rod 73. The fishing rod 73 with which the player character 70B is equipped is an equipment item possessed by the player character 70B and is an item stored in the player-B saved data. When the player character 70B does not possess a fishing rod, and even when the player character 70A is equipped with the fishing rod 73, the player character 70B is equipped with no equipment item.

The player character 70A and the player character 70B equipped with the fishing rod 73 perform fishing in accordance with operations on the player A and the player B, respectively. For example, when a predetermined operation is performed when the player character 70A is directed to a fish object 74 in the river object 76, the player character 70A performs the operation of casting their line from the fishing rod 73 and catches the fish object 74. As a result, the fish object 74 is stored as a virtual object possessed by the player character 70A in the player-A saved data. As described above, the main character and the sub character are equipped with the same equipment item in accordance with an operation of the player on the main character and can execute the same behavior associated with the equipment item. Consequently, a plurality of players can share a behavior and have a sense of togetherness.

It should be noted that the player corresponding to the main character can select with which equipment item the player characters are to be equipped, but the player corresponding to the sub character cannot select an equipment item.

Further, also in the multiplay mode, the main character can, for example, create an equipment item from a possessed virtual object or exchange a virtual object for an equipment item. However, the sub character cannot create or exchange an equipment item.

As described above, the main character can move, select an equipment item, and perform a behavior corresponding to an equipment item. On the other hand, the sub character can move and perform a behavior corresponding to an equipment item, but cannot select an equipment item. Further, the movement range of the sub character is also limited based on the position of the main character.

It should be noted that an equipment item associated with the same behavior may have a plurality of versions that differ in function, performance, or effect. For example, when the main character possesses an equipment item of a first version associated with a predetermined behavior, and the main character is equipped with the equipment item of the first version, the sub character may be equipped with the equipment item of a second version possessed by the sub character and associated with the same behavior. For example, suppose that there are a gold axe and a silver axe as equipment items. The gold axe and the silver axe are equipment items associated with the same behavior (the behavior of cutting a tree). When the main character possesses the gold axe, and the sub character possesses the silver axe, in accordance with the fact that the main character is equipped with the gold axe, the sub character may be equipped with the silver axe. That is, when the main character is equipped with a predetermined equipment item (the gold axe), thereby selecting the behavior of cutting a tree as a behavior that can be executed, and when the sub character possesses an equipment item (the silver axe) associated with the same behavior (the behavior of cutting a tree), the sub character may be equipped with the equipment item (the silver axe) associated with the same behavior.

Further, regardless of whether or not the sub character possesses the equipment item, the sub character may be equipped with the same equipment item (or an equipment item associated with the same behavior) as the main character. Consequently, the sub character may be able to execute the same behavior as the main character.

Further, the main character and the sub character may be able to be equipped with different equipment items. For example, in accordance with an operation of the player A, the player character 70A as the main character may be equipped with a fishing rod, and in accordance with an operation of the player B, the player character 70B as the sub character may be equipped with a scoop. In this case, the player character 70A and the player character 70B can execute behaviors different from each other. Further, when the sub character possesses the same equipment item as an equipment item with which the main character is equipped, the sub character may be equipped with the same equipment item. When the sub character does not possess the same equipment item, the sub character may be equipped with a different equipment item possessed by the sub character.

(Switching Between Main Character and Sub Character)

In the exemplary embodiment, the main character and the sub character can be switched in accordance with an operation of the player corresponding to the main character. That is, the player character set as the main character can be switched to the sub character, and the player character set as the sub character can be switched to the main character. FIG. 18 is a diagram showing an example of a game image after the main character is switched from the player character 70A to the player character 70B.

For example, when the player character 70A is set as the main character, a predetermined instruction operation (e.g., the pressing of the minus button 47) on the left controller 3 corresponding to the player character 70A is performed, an image for selecting to which player character the main character is to be switched is displayed. At this time, using the right controller 4, the player B performs a predetermined operation for switching to the main character. As a result, the player character 70B corresponding to the player B is set as the main character, and the player character 70A is set as the sub character. From this point onward, the player character 70B is controlled as the main character, and the player character 70A is controlled as the sub character. Specifically, similarly to the above, the virtual camera is controlled so that the player character 70B is always included in the field of view of the virtual camera. Further, when the player character 70B is equipped with an equipment item, and when the player character 70A possesses the same equipment item, the player character 70A is also equipped with the same equipment item.

When an instruction to end the multiplay mode is given based on an operation of the player corresponding to the main character B in the state where the player character 70B is set as the main character, and the player character 70A is set as the sub character, the game returns to the single-play mode. At this time, the game in the single-play mode by the player character 70B is resumed.

(Key Assignment in Multiplay Mode)

Next, a description is given of the key assignment of each controller in the multiplay mode. As described above, in the single-play mode, basically, a player performs the game using both the left and right controllers. On the other hand, in the multiplay mode, each player performs the game using either of the left and right controllers. For example, using the left controller 3, the player A operates the player character 70A set as the main character. Further, using the right controller 4, the player B operates the player character 70B set as the sub character.

In the multiplay mode, since each player performs the game using either of the left and right controllers, the same keys as the keys in the single-play mode cannot be assigned to game operations in the multiplay mode. In the exemplary embodiment, regarding the main character in the multiplay mode, the operation mode of a controller is switched between a first mode (a default mode) and a second mode (a mode after the switching).

FIG. 19 is a diagram showing an example of the key assignment for the main character in a case where the controller corresponding to the main character is the left controller 3 (the first mode).

When the single-play mode is switched to the multiplay mode, the operation mode of the controller is the first mode by default. As shown in FIG. 19, in the first mode, the analog stick 32 of the left controller 3 is used to specify the moving direction of the main character. Further, the down direction button 34 of the left controller 3 is used to cause the player character to perform a behavior corresponding to an equipment item. The left direction button 36 of the left controller 3 is used to cause the player character to dash. Further, the right direction button 33 of the left controller 3 is used to display the virtual object menu. Further, the up direction button 35 of the left controller 3 is used to cause the player character to perform the action of picking up a virtual object lying in the virtual space.

When the operation mode of the left controller 3 is the first mode, and when a predetermined switching operation (e.g., the operation of pressing the analog stick 32) is performed, the operation mode of the left controller 3 is switched to the second mode.

FIG. 20 is a diagram showing an example of the key assignment for the main character in a case where the controller corresponding to the main character is the left controller 3 (the second mode).

As shown in FIG. 20, in the second mode, the analog stick 32 of the left controller 3 is used to control the position and the orientation of the virtual camera. Further, the left direction button 36 and the right direction button 33 of the left controller 3 are used to change an equipment item with which the player character is equipped. The up direction button 35 of the left controller 3 is used to store away an equipment item (so that the player character is not equipped with the equipment item). Further, the down direction button 34 of the left controller 3 is used to display the equipment item menu.

It should be noted that the display form of the main character differs between when the operation mode of the controller is the first mode and when the operation mode of the controller is the second mode. This enables the player to distinguish which mode the operation mode of the controller currently is.

As is clear from FIGS. 19 and 20, also in the multiplay mode, the player can perform the same operations as those in the single-play mode on the main character. If the key assignment in the single-play mode shown in FIG. 10 and the key assignment in the multiplay mode shown in FIGS. 19 and 20 are compared, when the operation mode is set to the first mode in the multiplay mode, the analog stick 32 and the buttons 34, 36, 33, and 35 of the left controller 3 correspond to the analog stick 32 of the left controller 3 and the buttons 53 to 56 of the right controller 4, respectively, in the single-play mode. Further, when the operation mode is set to the second mode in the multiplay mode, the analog stick 32 and the buttons 34, 36, 33, and 35 of the left controller 3 correspond to the analog stick 52 of the right controller 4 and the buttons 33 to 36 of the left controller 3, respectively, in the single-play mode.

In the single-play mode, the left controller 3 and the right controller 4 are held in vertically long orientations by the player (see FIG. 9). In the multiplay mode, however, the left controller 3 is held in a horizontally long orientation by each player (FIG. 11). The arrangement of the buttons 33 to 36 viewed from the player differs between when each controller is held in the vertically long orientation and when the controller is held in the horizontally long orientation. Thus, game operations are assigned to keys so that the arrangement of the keys viewed from the player is the same between the single-play mode and the multiplay mode. For example, the operation of causing the player character to perform a behavior corresponding to an equipment item is performed using a button on the right side as viewed from the player both in the single-play mode and the multiplay mode. Specifically, in the single-play mode, the operation of causing the player character to perform a behavior corresponding to an equipment item is performed using the A-button 53 of the right controller 4 (the button on the rightmost side among the buttons to be pressed by the right hand). In the multiplay mode, the operation of causing the player character to perform a behavior corresponding to an equipment item is performed using the down direction button 34 of the left controller 3 (the button on the rightmost side among the buttons to be pressed by the right hand).

As described above, in the multiplay mode, different types of game control is performed by switching the operation mode of a single controller between the first mode and the second mode. For example, in the first mode, as game control, movement control on the player character, control for causing the player character to perform a behavior corresponding to an equipment item, and control on a virtual object possessed by the player character are performed. Further, in the second mode, as game control, control on the virtual camera and control for selecting an equipment item with which the player character is to be equipped are performed. Consequently, even when the number of keys of the controller is smaller than the types of game control that can be performed by the player, the player can perform various types of game control. It should be noted that also in the single-play mode, the operation mode of a single controller may be switched between the first mode and the second mode, and different types of game control may be performed.

FIG. 21 is a diagram showing an example of the key assignment for the sub character in a case where the controller corresponding to the sub character is the right controller 4.

As shown in FIG. 21, for example, the analog stick 52 of the right controller 4 is used to specify the moving direction of the sub character. Further, the X-button 55 of the right controller 4 is used to cause the player character to perform a behavior corresponding to an equipment item. The A-button 53 of the right controller 4 is used to cause the player character to dash.

Further, the B-button 54 of the right controller 4 is used to re-display a predetermined image near the sub character. This predetermined image is, for example, an image for representing the emotion of the player character, and a plurality of predetermined images are prepared in advance.

The player can select a predetermined image from a menu and display the predetermined image near the player character. For example, when a predetermined button (e.g., the second R-button 44 or the second R-button 66) of the controller is pressed, a menu for selecting a predetermined image is displayed. When any of the plurality of predetermined images is selected in the menu, the selected predetermined image is displayed near the player character. The operation of selecting a predetermined image in the menu and displaying the predetermined image can also be performed in the single-play mode, and can also be performed for the main character and the sub character in the multiplay mode. When the B-button 54 is pressed as an operation on the sub character in the multiplay mode, a predetermined image most recently selected in the menu is re-displayed. A button for re-displaying this predetermined image is assigned only to the sub character. That is, a button for re-displaying a predetermined image is not assigned to the main character in the multiplay mode. Further, also in the single-play mode, a button for re-displaying a predetermined image is not assigned, either.

It should be noted that FIGS. 19 and 20 show an example where the main character is operated using the left controller 3. The assignment of keys is the same also in a case where the main character is operated using the right controller 4. That is, the analog stick 32 and the buttons 33 to 36 of the left controller 3 in FIGS. 19 and 20 are replaced with the analog stick 52 and the buttons 53 to 56 of the right controller 4, respectively. Further, FIG. 21 shows an example where the sub character is operated using the right controller 4. The assignment of keys is the same also in a case where the sub character is operated using the left controller 3. That is, the analog stick 52 and the buttons 53 to 56 of the right controller 4 in FIG. 21 are replaced with the analog stick 32 and the buttons 33 to 36 of the left controller 3, respectively.

Further, a description has been given above of a case where two players perform the multiplay game. In the exemplary embodiment, however, up to four players can simultaneously perform the game. For example, when four players perform the multiplay game, two left controllers 3 and two right controllers 4 are wirelessly connected to the main body apparatus 2. A single player character is associated with each controller, and in accordance with an operation on each controller, the player character corresponding to the controller is controlled. Any of the four player characters is set as a main character, and the other three player characters are set as sub characters.

As described above, in the game according to the exemplary embodiment, a player can call another player when performing the game in the single-play mode. When the player calls the other player, initially, a player character of the player who has called the other player is set as a main character, and a player character of the called player is set as a sub character. The main character and the sub character are placed in the virtual space, and the virtual camera is controlled so that the main character and the sub character are included in the field of view of the virtual camera. Specifically, the virtual camera moves by following the main character and is controlled so that the main character is always included in the field of view of the virtual camera. Further, when the sub character comes out of the field of view of the virtual camera, the sub character moves into the field of view of the virtual camera.

Further, the main character selects an equipment item in accordance with an operation of the player, thereby becoming able to execute a behavior corresponding to the equipment item. The sub character is equipped with the same equipment item as the main character or an equipment item associated with the same behavior as the main character, whereby the sub character becomes able to execute the same behavior as the main character. Consequently, a plurality of players can share a behavior.

(Details of Game Processing)

Next, an example of game processing performed by the main body apparatus 2 is specifically described. First, data stored in the main body apparatus 2 is described.

Figure 22:
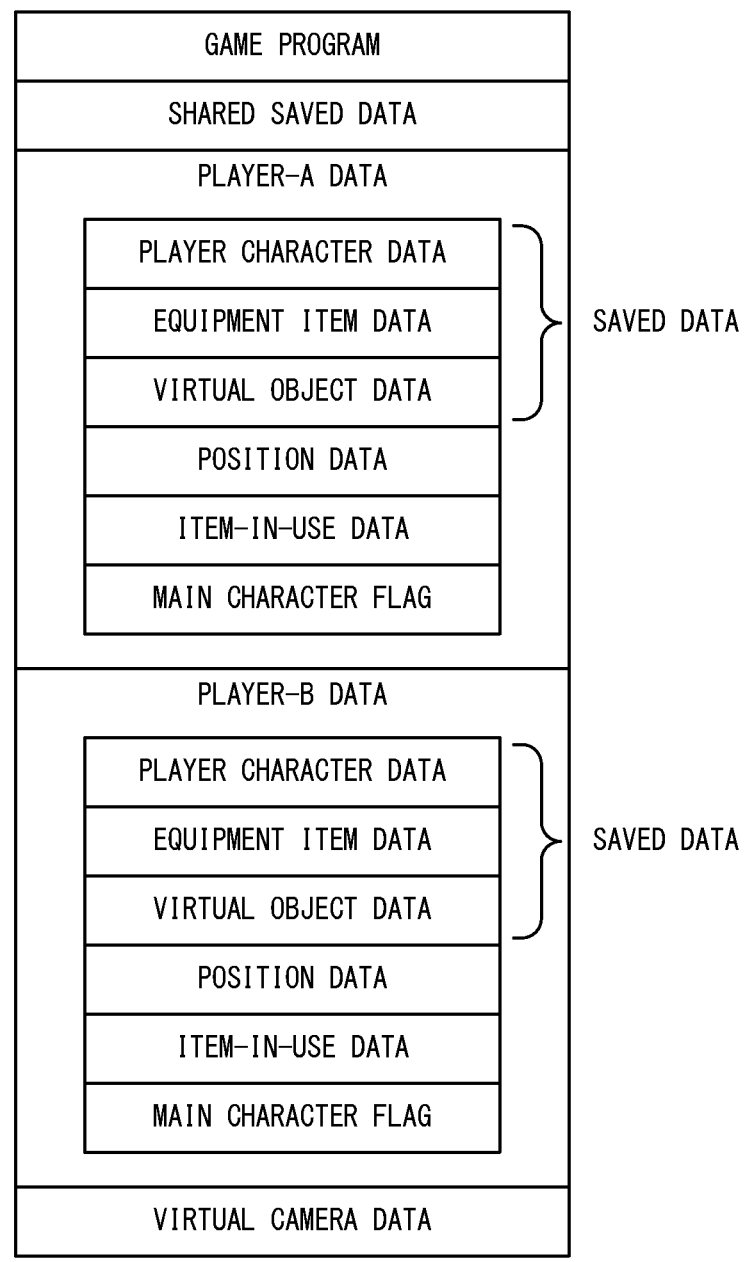
FIG. 22 is a diagram showing an example of data stored in (a DRAM 85 or a flash memory 84 of) the main body apparatus 2.

FIG. 22 is a diagram showing an example of the data stored in (the DRAM 85 or the flash memory 84 of) the main body apparatus 2. It should be noted that a description is given below of a case where two players, namely a player A and a player B, perform the multiplay game.

As shown in FIG. 22, in the main body apparatus 2, a game program, shared saved data, player-A data, player-B data, and virtual camera data are stored. In addition to these pieces of data, various pieces of data necessary for the game are stored.

The game program is a program for executing game processing according to the exemplary embodiment. The game program is stored in, for example, an external storage medium. When the game is started, the game program is loaded from the external storage medium into the DRAM 85.

The player-A data is data regarding the player A and includes player-A saved data. The player-A data includes, as the player-A saved data, player character data, equipment item data, and virtual object data. The player character data is data regarding the name, the face, the habitus, the clothing, and the like of a player character 70A created by the player A. The equipment item data is data regarding an equipment item possessed by the player character 70A. Further, the virtual object data is data regarding a virtual object (a fish, an insect, or the like) possessed by the player character 70A.

Further, as data regarding the player character 70A used during the execution of the game, position data, item-in-use data, a main character flag, and the like are stored. The position data is data indicating the current position of the player character 70A in a virtual space. Further, the item-in-use data is data indicating an equipment item with which the player character 70A is currently equipped. The main character flag is data indicating whether or not the player character 70A is set as a main character. When the player character 70A is set as the main character, the main character flag is set to "ON".

Further, the player-B data is data regarding the player B. The player-B data also includes player-B saved data. The details of the player-B data are similar to those of the player-A data, and therefore is not described.

The virtual camera data is data indicating the position and the orientation of a virtual camera.

(Description of Flow Chart)

Figure 23:
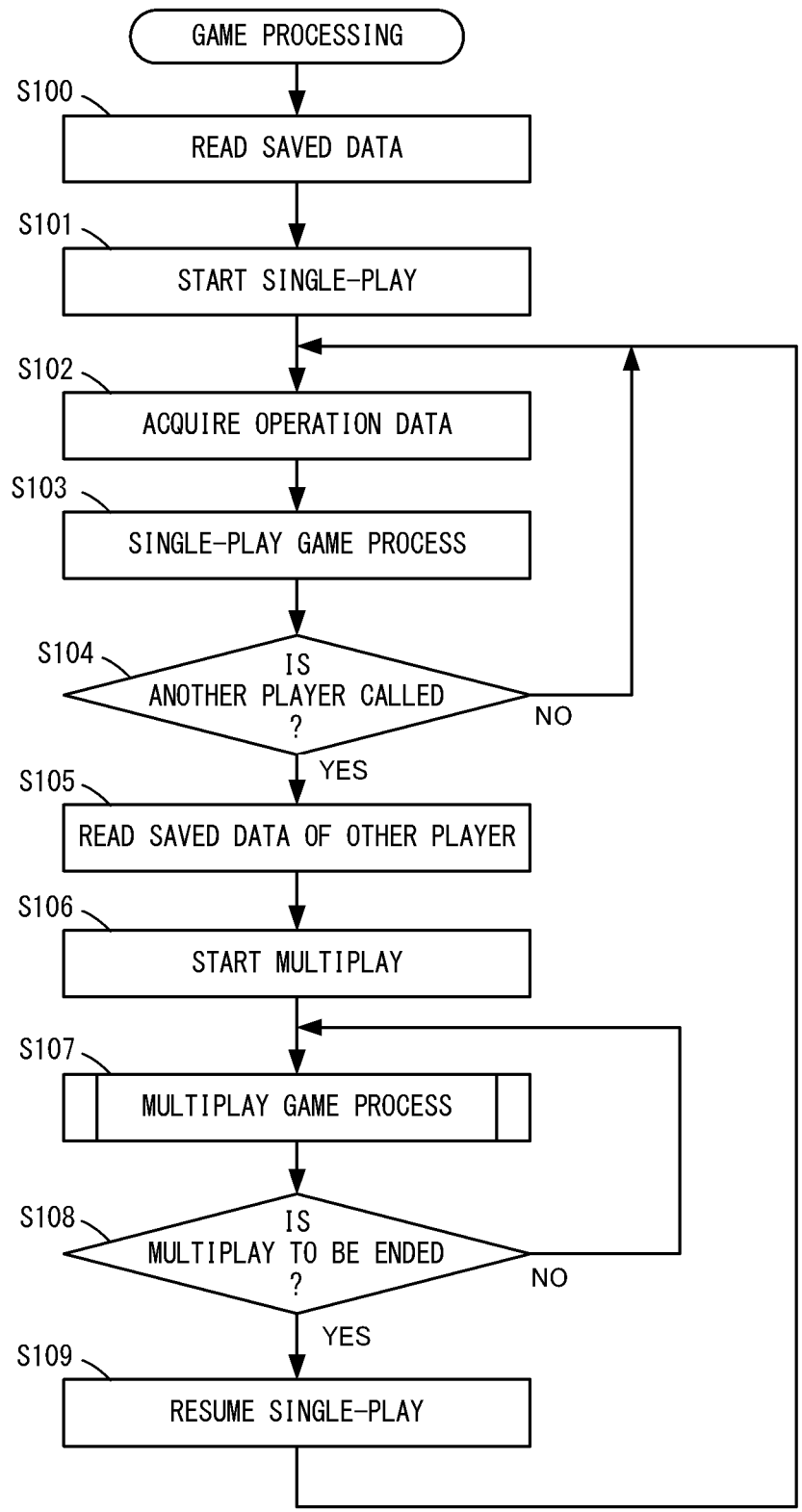
FIG. 23 is a flow chart showing an example of game processing performed by a processor 81 of the main body apparatus 2.

Next, a description is given of the details of the game processing performed by the main body apparatus 2. FIG. 23 is a flow chart showing an example of game processing performed by the processor 81 of the main body apparatus 2.

As shown in FIG. 23, when an instruction to start the game is given, first, the processor 81 reads saved data (step S100). Specifically, the processor 81 reads shared saved data shared by a plurality of players from the flash memory 84 and generates a virtual space based on the shared saved data. Further, when the game is started, the processor 81 specifies which of the players saved in the main body apparatus 2 is to perform the game. The processor 81 performs a login process on the specified player and reads saved data corresponding to the specified player from the flash memory 84. Then, based on the saved data corresponding to the specified player, the processor 81 generates a player character and places the player character in the virtual space. It should be noted that when the player is allowed to log in, the player may be requested to input a password. In this case, based on the input password, the processor 81 performs an authentication process. When the player is authenticated, the processor 81 reads saved data corresponding to the authenticated player.

Hereinafter, it is assumed that saved data of a player A is read in step S100. That is, the following description is given on the assumption that the player A starts the game.

When reading the saved data, the processor 81 starts the game in the single-play mode (step S101).

When the game is started in the single-play mode, the processor 81 acquires operation data from the left controller 3 and the right controller 4 (step S102). Next, based on the acquired operation data, the processor 81 performs a single-play game process (step S103). For example, when the player A provides a direction input using the analog stick 32 of the left controller 3, the processor 81 moves a player character 70A in the virtual space. Further, when, using the left controller 3, the player A performs the operation of selecting an equipment item, the processor 81 equips the player character 70A with the selected equipment item. Further, when the player A presses the A-button 53 of the right controller 4, the processor 81 causes the player character 70A to perform a behavior corresponding to the equipment item. Then, based on a virtual camera, the processor 81 generates a game image corresponding to the game processing and displays the generated game image on a display device (the display 12 or the stationary monitor).

After step S103, the processor 81 determines whether or not another player is called based on the acquired operation data (step S104). When the determination is NO in step S104, the processor 81 executes the process of step S102 again. The processes of steps S102 and S103 are repeatedly executed at predetermined time intervals (e.g., ¹⁄₆₀-second intervals), whereby a single player performs a single-play game using a single player character.

When it is determined that another player is called during the execution of the game in the single-play mode (step S104: YES), the processor 81 reads saved data of the other player (step S105). For example, when the player A gives an instruction to call a player B, the processor 81 performs a login process on the player B and reads player-B saved data. Hereinafter, the description is given on the assumption that the player-B saved data is read.

When the player-B saved data is read, the processor 81 starts the multiplay mode (step S106). Specifically, based on the player-B saved data read in step S105, the processor 81 generates a player character 70B and places the player character 70B in the virtual space. Further, the processor 81 sets the player character 70A as a main character and also sets the player character 70B as a sub character. Specifically, the processor 81 sets a main character flag in the player-A data to "ON" and also sets a main character flag in the player-B data to "OFF".

When the multiplay mode is started, the processor 81 performs a multiplay game process (step S107). The details of the multiplay game process will be described below. Next, the processor 81 determines whether or not the multiplay is to be ended (step S108). Specifically, based on operation data from the controller corresponding to the main character, the processor 81 determines whether or not an instruction to end the multiplay mode is given.

When an instruction to end the multiplay mode is not given (step S108: NO), the processor 81 executes the process of step S107 again. The process of step S107 is repeatedly executed at predetermined time intervals (e.g., ¹⁄₆₀-second intervals), whereby a plurality of players perform a multiplay game using a plurality of player characters.

On the other hand, when an instruction to end the multiplay mode is given (step S108: YES), the processor 81 resumes the single-play mode (step S109). Specifically, the processor 81 resumes the game in the single-play mode by the player character set as the main character at the time when the instruction to end the multiplay mode is given. The processor 81 performs a logoff process on the player character set as the sub character at the time when the instruction to end the multiplay mode is given. After the process of step S109, the processor 81 executes the process of step S102 again. Consequently, the game in the single-play mode is resumed by the player character set as the main character at the time when the instruction to end the multiplay mode is given.

(Multiplay Game Process)

Figure 24:
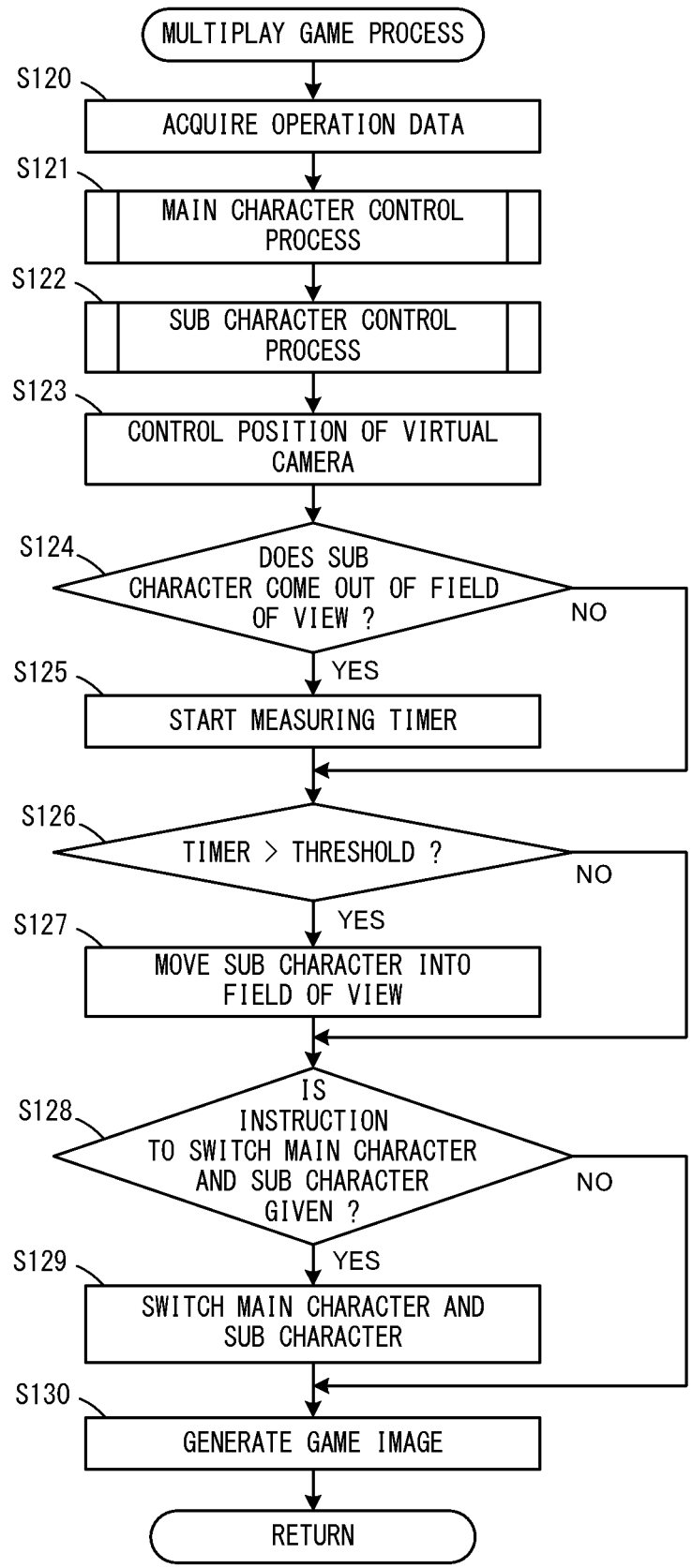
FIG. 24 is a flow chart showing an example of a multiplay game process in step S107.

Next, the details of the multiplay game process in step S107 are described. FIG. 24 is a flow chart showing an example of the multiplay game process in step S107.

The processor 81 acquires operation data from each controller (step S120). Specifically, the processor 81 acquires operation data from each of the left controller 3 corresponding to the player character 70A and the right controller 4 corresponding to the player character 70B.

Next, based on the operation data from the controller corresponding to the main character, the processor 81 performs a main character control process (step S121). The main character control process is performed on a single player character currently set as the main character. The details of the main character control process will be described below.

Subsequently, based on the operation data from the controller corresponding to the sub character, the processor 81 performs a sub character control process (step S122). The sub character control process is performed on one or more player characters currently set as sub characters. The details of the sub character control process will be described below.

After step S122, based on the position of the main character and the position of the sub character, the processor 81 controls the position of the virtual camera (step S123). Specifically, based on the position of the main character updated in step S121 and the position of the sub character updated in step S122, the processor 81 controls the position of the virtual camera so that at least the main character is included in the field of view of the virtual camera. For example, when the processor 81 calculates the center position between the main character and the sub character and sets the fixation point of the virtual camera at the calculated center position, the processor 81 determines whether or not the main character is included in the field of view of the virtual camera. When the fixation point of the virtual camera is set at the calculated center position, and the main character is included in the field of view of the virtual camera, the processor 81 sets the position of the virtual camera so that the fixation point of the virtual camera is the calculated center position. Further, when the fixation point of the virtual camera is set at the calculated center position, and the main character is not included in the field of view of the virtual camera, the processor 81 sets the fixation point of the virtual camera on the main character side of the calculated center position so that the main character is included in the field of view of the virtual camera.

It should be noted that in the exemplary embodiment, the virtual camera is moved in the left-right direction and/or the depth direction of the screen without changing the direction of the line of sight of the virtual camera so that the main character is included in the field of view of the virtual camera.

Next, based on the position of the virtual camera set in step S123 and the position of the sub character updated in step S122, the processor 81 determines whether or not the sub character comes out of the field of view of the virtual camera (step S124). When it is determined that the sub character comes out of the field of view of the virtual camera (step S124: YES), the processor 81 starts measuring a timer (step S125). The timer indicates the time elapsed since the sub character comes out of the field of view of the virtual camera. It should be noted that when a plurality of sub characters are present, the timer is set with respect to each sub character.

On the other hand, when the sub character does not come out of the field of view of the virtual camera (step S124: NO), next, the processor 81 performs the process of step S126. It should be noted that when the determination is NO in step S124, the processor 81 resets the timer to "0". That is, when the sub character comes out of the field of view of the virtual camera, and the sub character enters the field of view of the virtual camera again by the time when a predetermined time elapses, the timer is reset.

When the process of step S125 is performed, or when the determination is NO in step S124, the processor 81 determines whether or not the timer exceeds a predetermined threshold (e.g., 5 seconds) (step S126).

When the timer exceeds the predetermined threshold (step S126: YES), the processor 81 moves the sub character that has come out of the field of view of the virtual camera into the field of view of the virtual camera (step S127). Specifically, the processor 81 instantaneously moves the sub character that has come out of the field of view into the field of view of the virtual camera.

When the process of step S127 is performed, or when the determination is NO in step S126, the processor 81 determines whether or not an instruction to switch the main character and the sub character is given (step S128). Specifically, the processor 81 determines whether or not a switching instruction is given using the controller corresponding to the main character (e.g., the left controller 3).

When an instruction to switch the main character and the sub character is given (step S128: YES), the processor 81 switches the main character and the sub character (step S129). Specifically, the processor 81 determines whether or not, on the controller corresponding to any of the plurality of sub characters (e.g., the right controller 4), the operation of setting the sub character as the main character is performed. When the operation is performed, the processor 81 sets as the sub character the player character currently set as the main character and also sets as the main character the player character corresponding to the controller on which the operation is performed (the right controller 4). It should be noted that the processor 81 adds a flag object 71 to the player character newly set as the main character.

When the process of step S129 is performed, or when the determination is NO in step S128, the processor 81 generates a game image based on the virtual camera (step S130). The generated game image is output to the display device (the display 12 or the stationary monitor).

When the process of step S130 is executed, the processor 81 ends the processing shown in FIG. 24 and returns to the processing in FIG. 23.

(Main Character Control Process)

Figure 25:
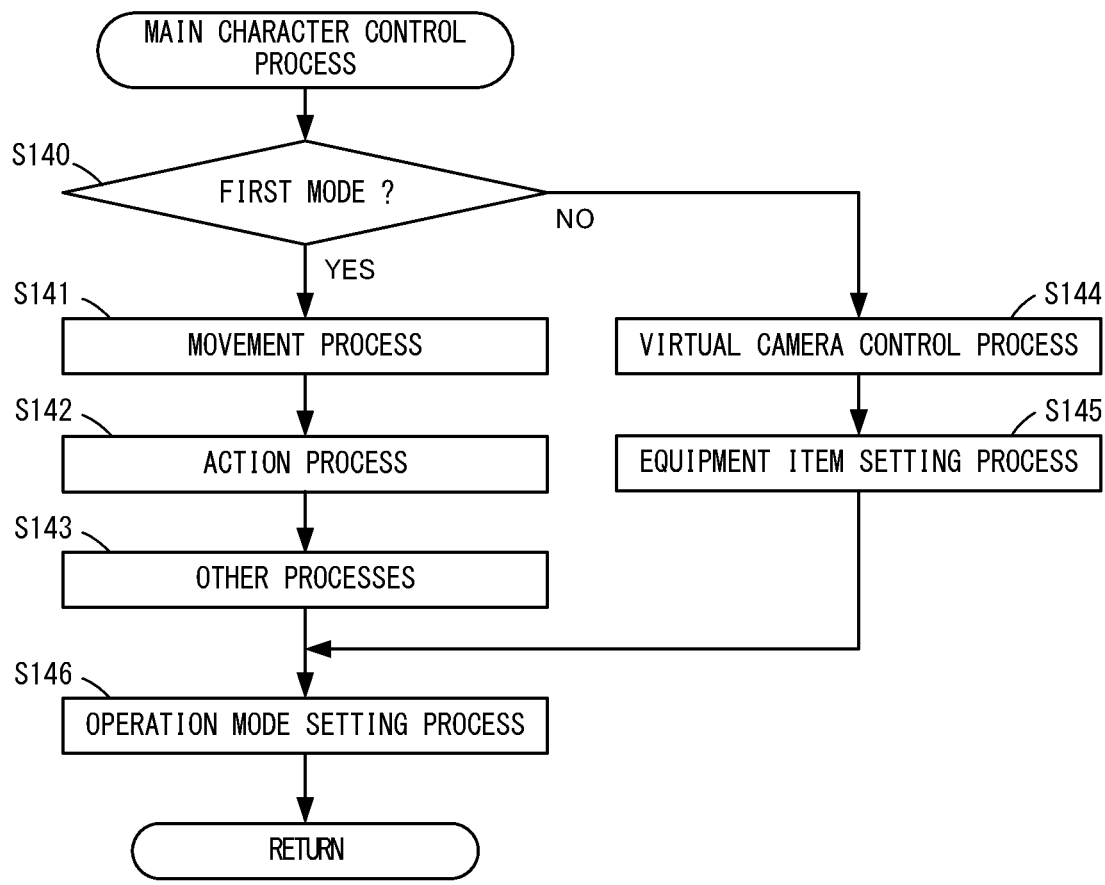
FIG. 25 is a flow chart showing an example of a main character control process in step S121 in FIG. 24.

Next, the details of the main character control process in step S121 are described. FIG. 25 is a flow chart showing an example of the main character control process in step S121 in FIG. 24. It should be noted that hereinafter, the description is given on the assumption that the controller corresponding to the main character is the left controller 3. However, the same applies to a case where the controller corresponding to the main character is the right controller 4.

The processor 81 determines whether or not the operation mode of the controller corresponding to the main character (the left controller 3) is the first mode (step S140).

When the operation mode of the controller is the first mode (step S140: YES), the processor 81 performs a main character movement process (step S141). Specifically, based on the operation data from the left controller 3, the processor 81 determines whether or not an operation on the analog stick 32 is performed. When an operation on the analog stick 32 is performed, the processor 81 moves the main character in the virtual space. At this time, when the left direction button 36 is pressed, the processor 81 moves the main character in a dashing manner.

Next, the processor 81 performs a main character action process (step S142). Specifically, based on the operation data from the left controller 3, the processor 81 determines whether or not the down direction button 34 is pressed. When the down direction button 34 is pressed, the processor 81 causes the main character to perform a behavior corresponding to an equipment item.

Next, the processor 81 performs other processes (step S143). As the other processes, for example, based on the pressing of the right direction button 33, the processor 81 displays a menu of an acquired virtual object. For example, in the menu, the main character can exchange the acquired virtual object for an equipment item or create an equipment item based on the virtual object. Further, based on the pressing of the up direction button 35, the processor 81 causes the main character to perform the action of picking up a virtual object lying in the virtual space.

On the other hand, when the operation mode of the controller is not the first mode (step S140: NO), i.e., the operation mode of the controller is the second mode, the processor 81 performs a virtual camera control process (step S144). Specifically, based on the operation data from the left controller 3, the processor 81 determines whether or not an operation on the analog stick 32 is performed. When an operation on the analog stick 32 is performed, the processor 81 changes the position and the orientation of the virtual camera. For example, in accordance with an operation on the analog stick 32, the virtual camera may move on a semicircle perpendicular to the ground of the virtual space with the main character at its center, while being directed to the main character.

Next, the processor 81 performs an equipment item setting process (step S145). The equipment item setting process is the process of, based on an operation on the controller corresponding to the main character, selecting an equipment item, equipping the main character with the equipment item, and also equipping the sub character with the same equipment item. Specifically, based on the operation data from the left controller 3, the processor 81 determines whether or not any of the buttons 33 to 36 is pressed. Then, the processor 81 performs a process corresponding to the pressed button. For example, when the button 33 or 36 is pressed, the processor 81 changes an equipment item with which the main character is equipped, thereby selecting a behavior that can be executed by the main character. When the sub character possesses the same equipment item (or an equipment item associated with the same behavior), the processor 81 equips the sub character with the equipment item. Further, when the down direction button 34 is pressed, the processor 81 displays a menu for allowing the player to select an equipment item. When an operation on the left controller 3 is performed while the menu is displayed, based on the performed operation, the processor 81 selects an equipment item and equips the main character with the selected equipment item. When the sub character possesses the same equipment item (or an equipment item associated with the same behavior), the processor 81 equips the sub character with the equipment item. Further, when the up direction button 35 is pressed, the processor 81 prevents the main character from being equipped with an equipment item and also prevents the sub character from being equipped with an equipment item.

When the process of step S143 is performed, or when the process of step S145 is performed, the processor 81 performs an operation mode setting process (step S146). Specifically, the processor 81 determines whether or not the operation of switching the operation mode (e.g., the operation of pressing the analog stick 32) is performed on the controller corresponding to the main character (the left controller 3). When the operation of switching the operation mode is performed, the processor 81 changes the operation mode from the current mode (e.g., the first mode) to another mode (the second mode).

When the process of step S146 is executed, the processor 81 ends the processing shown in FIG. 25 and returns to the processing in FIG. 24.

(Sub Character Control Process)

Figure 26:
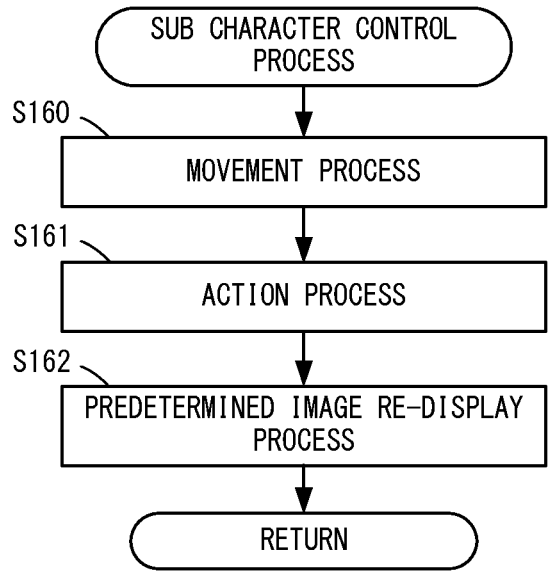
FIG. 26 is a flow chart showing an example of a sub character control process in step S122 in FIG. 24.

Next, the details of the sub character control process in step S122 are described. FIG. 26 is a flow chart showing an example of the sub character control process in step S122 in FIG. 24. It should be noted that hereinafter, the description is given on the assumption that the controller corresponding to the sub character is the right controller 4. However, the same applies to a case where the controller corresponding to the sub character is the left controller 3.

The processor 81 performs a sub character movement process (step S160). The process of step S160 is a process similar to the main character movement process in step S141. Specifically, based on the operation data from the controller corresponding to the sub character (the right controller 4), the processor 81 determines whether or not an operation on the analog stick 52 is performed. When an operation on the analog stick 52 is performed, the processor 81 moves the sub character in the virtual space. At this time, when the A-button 55 is pressed, the processor 81 moves the sub character in a dashing manner. It should be noted that when the main character and the sub character are a predetermined distance or more away from each other, and when the input direction of the analog stick 52 is a direction further away from the main character, the processor 81 does not move the sub character in the input direction. That is, when the sub character is displayed at the end of the screen, and when the analog stick 52 is operated in the direction in which the sub character comes out of the screen, the processor 81 does not move the sub character in the direction indicated by the analog stick 52.

Next, the processor 81 performs a sub character action process (step S161). The process of step S161 is a process similar to the main character action process in step S142. Specifically, based on the operation data from the right controller 4, the processor 81 determines whether or not the X-button 55 is pressed. When the X-button 55 is pressed, the processor 81 causes the sub character to perform a behavior corresponding to an equipment item. It should be noted that when the sub character is not equipped with the equipment item, the sub character performs no behavior.

Next, the processor 81 performs a predetermined image re-display process (step S162). Specifically, the processor 81 determines whether or not the B-button 54 is pressed. When the B-button 54 is pressed, the processor 81 re-displays a predetermined image (an image representing the emotion of the player character).

When the process of step S162 is executed, the processor 81 ends the processing shown in FIG. 26 and returns to the processing in FIG. 24.

It should be noted that the processes shown in the above flow charts are merely illustrative, and the order and the contents of the processes may be appropriately changed.

As described above, in the exemplary embodiment, basically, each player performs the game using saved data of the player themselves, but it is possible to perform the same game also in a multiplay mode. In the multiplay mode, a plurality of player characters appear in a virtual space, and a plurality of players operate player characters of the players themselves. One of the plurality of player characters is set as a main character, and the other player character is set as a sub character. Also in the multiplay mode, similarly to a single-play mode, a game image is displayed on a single screen. In the multiplay mode, the positions of a virtual camera and the sub character are controlled so that the main character and the sub character are included in the field of view of the virtual camera.

Specifically, when the sub character is not away from the main character, the position of the virtual camera is controlled so that both the main character and the sub character are included in the field of view of the virtual camera (step S123). When the main character moves in a direction away from the sub character, the virtual camera is moved by following the main character so that the main character is included in the field of view of the virtual camera (step S123). When the sub character comes out of the field of view of the virtual camera by the movement of the main character, the sub character is forcibly moved into the field of view of the virtual camera (step S127).

Further, when an equipment item is selected by the player corresponding to the main character, the main character is equipped with the selected equipment item, and the sub character is also equipped with the same equipment item (step S145). The main character and the sub character perform the same behavior using the same equipment item.

By such control, in a multiplay game performed by a plurality of players, it is possible to perform the game such that a single player character is a main player character. Further, since it is possible to switch a main character and a sub character, it is possible to perform the game in a balanced manner while the players make an adjustment.

Further, even when a game screen is not provided with respect to each player, a plurality of players can perform a game. When a multiplay game is performed, it is also possible that on split screens obtained by splitting a screen, player characters corresponding to the respective players are displayed. In this case, each split screen is smaller than a single screen, and further, each player may play the game by themselves. In the exemplary embodiment, however, a plurality of player characters appear on a single screen. Thus, it is easy for each player to grasp the motion of another player character. Thus, it is possible for a plurality of players to play the game with a sense of togetherness.

Further, a main character and a sub character can be equipped with the same equipment item and execute the same behavior. Thus, players can share a behavior and have a stronger sense of togetherness. Further, the main character selects a behavior that can be executed (an equipment item), and the sub character cannot select a behavior that can be executed, but can freely perform a behavior itself. Thus, the player corresponding to the sub character can somewhat freely play the game.

Further, a single player character is set as a main character on which an operation similar to a single-play mode can be performed, and another player character is set as a sub character on which an operation is limited. Thus, it is possible to prevent each player from completely freely performing the game and independently playing the game.

Further, in the exemplary embodiment, while a game is executed in a multiplay mode, it is possible to switch a player character set as a main character to a sub character and switch a player character set as the sub character to the main character. Thus, when a player corresponding to the sub character wishes to freely play the game without limitations, the player switches the sub character to the main character and thereby can play the game without limitations. For example, when the player corresponding to the sub character wishes to equip the sub character with a particular equipment item, the player can switch the sub character to the main character and select the particular equipment item by themselves. When the sub character does not possess the particular equipment item, the sub character can newly acquire or create the particular equipment item. In the exemplary embodiment, the behavior of a player character is determined in accordance with an equipment item, and the player character performs a behavior corresponding to the equipment item (e.g., the behavior of fishing or cutting a tree) and thereby can acquire a virtual object (a fish or a wood) corresponding to the behavior. When a player wishes to acquire a particular virtual object, the player switches a player character of the player themselves to the main character and selects the particular equipment item and thereby can select a behavior that enables the player character to acquire the particular virtual object.

Further, the exemplary embodiment is based on the premise that a plurality of player characters are included in a single game image. Thus, a plurality of players can switch a main character while directly consulting with each other regarding which player is to be set as the main character.

Further, in the exemplary embodiment, it is possible to vary a main character when a multiplay mode is started and a main character when the multiplay mode is ended and returned to a single-play mode. For example, when the player A performs the game in the single-play mode, and the player character 70B corresponding to the player B is called during the game in the single-play mode, and the multiplay mode is started, the player character 70A corresponding to the player A is set as the main character at the start of the multiplay mode. Then, the main character is switched from the player character 70A to the player character 70B. If the multiplay mode is ended when the player character 70B is set as the main character, the game in the single-play mode by the player character 70B (the player B) is resumed. It is possible to seamlessly switch the single-play mode and the multiplay mode. Thus, when the game in the single-play mode is performed, it is possible to light-heartedly cause another player to participate in the game.

Further, the game according to the exemplary embodiment includes shared saved data. When each player performs a game in a single-play mode, the game is performed using the shared saved data and player saved data corresponding to each player. Each player performs the game in the single-play mode, thereby updating the player saved data corresponding to each player and also updating the shared saved data. For example, when the player A plays the game in the single-play mode and constructs a house object in the virtual space, and when the player B plays the game in the single-play mode next, the house object is already constructed in the virtual space. As described above, in the game according to the exemplary embodiment, each player performs the game, thereby updating the shared saved data.

Also when the game is performed in a multiplay mode on the premise of such a game, the game is performed using the shared saved data and the player saved data corresponding to each player. Thus, it is possible to perform the game in the multiplay mode similarly to the single-play mode, and in the multiplay mode, a plurality of players can cooperate to play the game. In the multiplay mode, the plurality of players can cooperate to update the shared saved data and efficiently update the shared saved data.

VARIATIONS

While image processing according to the exemplary embodiment has been described above, the above exemplary embodiment is merely an example, and may be modified as follows, for example.

For example, in the above exemplary embodiment, when the sub character comes out of the field of view of the virtual camera by the movement of the main character, and when the predetermined time elapses, the sub character is moved into the field of view of the virtual camera. In another exemplary embodiment, when the sub character almost comes out of the field of view of the virtual camera by the movement of the main character, the sub character may be moved so that the sub character does not come out of the screen. For example, when the sub character is displayed at the left end of the screen as shown in FIG. 16, and when the main character moves in the right direction, control may be performed so that the sub character automatically moves in the right direction (moves by being fixed at the left end of the screen) and does not come out of the screen.

Further, in the above exemplary embodiment, only a single piece of shared saved data shared by a plurality of players is stored in the main body apparatus 2, and the virtual space is defined based on the same shared saved data both in the single-play mode and the multiplay mode.

In another exemplary embodiment, a virtual space may be defined based on saved data stored with respect to each player. Specifically, each player has a set of virtual space saved data for defining the virtual space and player saved data regarding a player character (data of the player character itself and data regarding an equipment item and an acquired virtual object). For example, a player A has virtual space-A saved data and player-A saved data, and a player B has virtual space-B saved data and player-B saved data. When the player A plays the game in the single-play mode, the virtual space-A saved data and the player-A saved data are read, and the game is performed in a virtual space A based on the virtual space-A saved data. When the player B plays the game in the single-play mode, the virtual space-B saved data and the player-B saved data are read, and the game is performed in a virtual space B based on the virtual space-B saved data. In such a case, when a game is performed in a multiplay mode, a virtual space may be defined based on virtual space saved data of any one of a plurality of players, and the game may be performed in the multiplay mode.

Further, in the above exemplary embodiment, the virtual camera is moved without changing the direction of the line of sight of the virtual camera so that the main character is included in the field of view of the virtual camera. In another exemplary embodiment, the direction of the line of sight of the virtual camera may be changed so that the main character is included in the field of view of the virtual camera. The direction of the virtual camera may be controlled so that the virtual camera is directed to the main character. Further, the angle of view of the virtual camera may be changed, or the virtual camera may be moved in the depth direction of the screen so that the main character is included in the field of view of the virtual camera. That is, the virtual camera may be controlled (at least any of the movement of the virtual camera, a change in the direction of the line of sight of the virtual camera, and a change in the angle of view of the virtual camera) so that the main character is included in the field of view of the virtual camera.

Further, in the above exemplary embodiment, based on the fact that a predetermined instruction operation (e.g., the pressing of the minus button 47) is performed on the controller corresponding to the main character, the main character and the sub character are switched. In another exemplary embodiment, based on a predetermined instruction operation on the controller corresponding to the sub character, the main character and the sub character may be switched.

Further, in the above exemplary embodiment, a plurality of player characters (up to four player characters) are displayed on a single screen. In another exemplary embodiment, the screen does not necessarily need to be a single screen. For example, when four players perform the game, the screen may be split into two screens, and two player characters may be displayed on each split screen.

Further, the above game is merely an example, and the above processing may be performed in any other game.

Further, in the above exemplary embodiment, the above processing is performed by the main body apparatus 2 in the game system 1. Alternatively, the above processing may be executed by any other information processing apparatus (e.g., a personal computer, a smartphone, or a tablet terminal) or the like. Further, in another exemplary embodiment, for example, the above processing may be performed by a game system including a plurality of apparatuses connected together via a network such as the Internet (e.g., an information processing system including a terminal and a server). For example, saved data (each piece of player saved data and common saved data) may be saved on a server or a cloud on the Internet, and the above game may be performed by a local main body apparatus 2 reading the saved data. Further, a display device and a plurality of operation devices may be locally placed, and information regarding an operation performed on each of the plurality of operation devices is transmitted to one or more servers on the Internet, and the game processing of the main body apparatus 2 may be executed by the server. Then, a game image corresponding to the game processing may be displayed on the locally placed display device.

While the exemplary embodiment has been described, the above description is merely illustrative, and the exemplary embodiment may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:
1. A game system comprising:
circuitry configured to
read shared data corresponding to a plurality of players of a game from a storage medium;
generate a virtual space for the game based on the shared data;
read player data corresponding to each of the plurality of players from the storage medium;

generate a plurality of player characters in the virtual space based on the player data;
set a first player character of the plurality of player characters as a main character and a second player character of the plurality of player characters as a sub-character;
control movement of the main character in the virtual space in response to an input received at an operation device corresponding to the main character;
control a field of view of the game to be displayed so that at least the main character is included in the field of view;
generate a game image based on the field of view of the game to be displayed;
control movement of the sub-character in the virtual space in response to an input received at an operation device corresponding to the sub-character, the operation device corresponding to the sub-character being different than the operation device corresponding to the main character;
control the sub-character so that the sub-character is moved into the field of view in a case that the sub-character has moved out of the field of view;
switch the first player character from the main character to the sub-character and the second player from the sub-character to the main character in response to an input received at least at one of the operation device corresponding to the main character and the operation device corresponding to the sub-character.

2. The game system of claim 1, wherein the circuitry is configured to:
select a game play behavior from a plurality of game play behaviors that can be executed by the player characters in response to an input received at the operation device corresponding to the main character;
control the main character to perform the selected game play behavior based on an input received at the operation device corresponding to the main character; and
control the sub-character to perform the selected game play behavior based on an input received at the second operation device.

3. The game system of claim 2, wherein the circuitry is configured to:
cause one or more of the player characters to acquire a virtual object within the virtual space; and
store information indicating that the virtual object has been acquired in player data corresponding to the one or more player characters.

4. The game system of claim 2, wherein the circuitry is configured to:
select the game play behavior based on an input received at the operation device corresponding to the main character selecting an equipment item to be allocated to the main character;
equip the main character with the selected equipment item; and
equip the sub-character with the selected equipment item or with an equipment item associated with the selected game play behavior.

5. The game system of claim 1, wherein the circuitry is configured to:
identify that the sub-character has moved outside of the field of view; and
control, in a case that a predetermined time has elapsed from when the sub-character has moved out of the field of view, the sub-character to move into the field of view.

6. The game system of claim 1, wherein the circuitry is configured to:
generate the first player character based on saved data of a first player among the plurality of players and initiate a single-play game process using the first player character;
during the single-play game process, in accordance with a start operation, generate the second player character in the virtual space based on saved data of a second player among the plurality of players and perform a multiplay game process using at least the first player character and the second player character such that the first player character is the main character, and the second player character is the sub-character;
during the multiplay game process, in accordance with the input received at least at one of the operation device corresponding to the main character and the operation device corresponding to the sub-character, switch the first player character from the main character to the sub-character and the second player character from the sub-character to the main character; and
during the multiplay game process, in accordance with an end operation, resume the single-play game process using the second player character as the main character.

7. The game system of claim 1, wherein
the virtual space is generated based on the shared data corresponding to the plurality of players,
the storage medium includes a first storage area configured to store the shared data corresponding to the plurality of players and a second storage area divided with respect to the player data corresponding to each of the plurality of players,
saved data for generating the virtual space is stored in the first storage area, and
saved data for generating the player characters is stored in the second storage area.

8. The game system according to claim 1, wherein the circuitry is configured to:
generate one of the first and second the player characters based on the player data corresponding to one of the plurality of players;
execute a single-play game process using the one of the first and second player characters;
during the execution of the single-play game process, perform first game control in accordance with an input received at a first operation device and perform second game control in accordance with an input received at a second operation device;
generate a second one of the first and second player characters based on the data corresponding to a second one of the plurality of players, set one of the first and second player characters as the main character, and set the one of the first and second player characters other than the main character as the sub-character, thereby executing a multiplay game process using the first character and the second character; and
during the execution of the multiplay game process,
in accordance with a switching operation on the first operation device, set an operation mode of the first operation device to a first mode or a second mode, and
when the operation mode is the first mode, perform the first game control in accordance with an operation on the first operation device, and when the operation mode is the second mode, perform the second game control in accordance with the operation on the first operation device.

9. A non-transitory computer-readable storage medium having stored therein a game program executed by a processor for performing game processing based on operation data from a plurality of operation devices, the game program causing the processor to:
  read shared data corresponding to a plurality of players of a game from a storage medium;
  generate a virtual space for the game based on the shared data;
  read player data corresponding to each of the plurality of players from the storage medium;
  generate a plurality of player characters in the virtual space based on the player data;
  set a first player character of the plurality of player characters as a main character and a second player character of the plurality of player characters as a sub-character;
  control movement of the main character in the virtual space in response to an input received at an operation device corresponding to the main character;
  control a field of view of the game to be displayed so that at least the main character is included in the field of view;
  generate a game image based on the field of view of the game to be displayed;
  control movement of the sub-character in the virtual space in response an input received at an operation device corresponding to the sub-character, the operation device corresponding to the sub-character being different than the operation device corresponding to the main character;
  control the sub-character so that the sub-character is moved into the field of view in a case that the sub-character has moved out of the field of view;
  switch the first player character from the main character to the sub-character and the second player from the sub-character to the main character in response to an input received at least at one of the operation device corresponding to the main character and the operation device corresponding to the sub-character.

10. The storage medium of claim 9, wherein the game program further causes the processor to:
  select a game play behavior from a plurality of game play behaviors that can be executed by the player characters in response to an input received at the operation device corresponding to the main character;
  control the main character to perform the selected game play behavior based on an input received at the operation device corresponding to the main character; and
  control the sub-character to perform the selected game play behavior based on an input received at the second operation device.

11. The storage medium of claim 10, wherein the game program further causes the processor to:
  cause one or more players to acquire a virtual object within the virtual space; and
  store information indicating that the virtual object has been acquired in player data corresponding to the one or more player characters.

12. The storage medium of claim 10, wherein the game program further causes the processor to:
  select the game play behavior based on an input received at the operation device corresponding to the main character selecting an equipment item to be allocated to the main character;
  equip the main character with the selected equipment item; and
  equip the sub-character with the selected equipment item or an equipment item associated with the selected game play behavior.

13. The storage medium of claim 9, wherein the game program further causes the processor to:
  identify that the sub-character has moved out of the field of view; and
  control, in a case that a predetermined time has elapsed from when the sub-character has moved out of the field of view, the sub-character to move into the field of view.

14. The storage medium of claim 9, wherein the game program further causes the processor to:
  generate the first player character based on saved data of a first player among the plurality of players and initiate a single-play game process using the first player character;
  during the single-play game process, in accordance with a start operation, generate the second player character in the virtual space based on saved data of a second player among the plurality of players and perform a multiplay game process using at least the first player character and the second player character such that the first player character is the main character, and the second player character is the sub-character,
  during the multiplay game process, in accordance with the input received at least at one of the operation device corresponding to the main character and the operation device corresponding to the sub-character, switch the first player character from the main character to the sub-character and the second player character from the sub-character to the main character; and
  during the multiplay game process, in accordance with an end operation, resume the single-play game process using the second player character set as the main character.

15. The storage medium of claim 9, wherein
  the virtual space is generated based on the shared data corresponding to the plurality of players, and
  the storage medium includes a first storage area configured to store the shared data corresponding to the plurality of players and a second storage area divided with respect to the player data corresponding to each of the plurality of players,
  saved data for generating the virtual space is stored in the first storage area, and
  saved data for generating the player characters is stored in the second storage area.

16. The storage medium of claim 9, wherein the game program further causes the processor to:
  generate one of the first and second player characters based on the player data corresponding to one of the plurality of players;
  execute a single-play game process using the one of the first and second player characters;
  during the execution of the single-play game process, perform first game control in accordance with an input received at a first operation device and perform second game control in accordance with an input received at a second operation device;
  generate a second one of the first and second player characters based on the data corresponding to a second one of the plurality of players, set one of the first and second player characters as the main character, and set the one of the first and second player characters other than the main character as the sub-character, thereby executing a multiplay game process using the first character and the second character; and during the execution of the multiplay game process, in accordance with a switching operation on the first operation device, set an operation mode of the first operation device to a first mode or a second mode, and when the operation mode is the first mode, perform the first game control in accordance with an operation on the first operation device, and when the operation mode is the second mode, perform the second game control in accordance with the operation on the first operation device.

17. An information processing apparatus for performing game processing based on operation data from a plurality of operation devices, the information processing apparatus configured to:

read shared data corresponding to a plurality of players of a game from a storage medium;

generate a virtual space for the game based on the shared data;

read player data corresponding to each of the plurality of players from the storage medium;

generate a plurality of player characters in the virtual space based on the player data;

set a first player character of the plurality of player characters as a main character and a second player character of the plurality of player characters as a sub-character;

control movement of the main character in the virtual space in response to an input received at an operation device corresponding to the main character;

control a field of view of the game to be displayed so that at least the main character is included in the field of view;

generate a game image based on the field of view of the game to be displayed;

control movement of the sub-character in the virtual space in response an input received at an operation device corresponding to the sub-character, the operation device corresponding to the sub-character being different than the operation device corresponding to the main character;

control the sub-character so that the sub-character is moved into the field of view in a case that the sub-character has moved out of the field of view, switch the first player character from the main character to the sub-character and the second player from the sub-character to the main character in response to an input received at least at one of the operation device corresponding to the main character and the operation device corresponding to the sub-character.

18. The information processing apparatus of claim 17, further configured to:

select a game play behavior from a plurality of game play behaviors that can be executed by the player characters in response to an input received at the operation device corresponding to the main character;

control the main character to perform the selected game play behavior based on an input received at the operation device corresponding to the main character; and control the sub-character to perform the selected game play behavior based on an input received at the second operation device.

19. A game processing method performed by a game system for performing game processing based on operation data from a plurality of operation devices, the game processing method comprising:

reading shared data corresponding to a plurality of players of a game from a storage medium;

generating a virtual space for the game based on the shared data;

reading player data corresponding to each of the plurality of players from the storage medium;

generating a plurality of player characters in the virtual space based on the player data;

setting a first player character of the plurality of player characters as a main character and a second player character of the plurality of player characters as a sub-character;

controlling movement of the main character in the virtual space in response to an input received at an operation device corresponding to the main character;

controlling a field of view of the game to be displayed so that at least the main character is included in the field of view;

generating a game image based on the field of view of the game to be displayed;

controlling movement of the sub-character in the virtual space in response an input received at an operation device corresponding to the sub-character, the operation device corresponding to the sub-character being different than the operation device corresponding to the main character;

controlling the sub-character so that the sub-character is moved into the field of view in a case that the sub-character has moved out of the field of view;

switching the first player character from the main character to the sub-character and the second player from the sub-character to the main character in response to an input received at least at one of the operation device corresponding to the main character and the operation device corresponding to the sub-character.

20. The game processing method of claim 19, further comprising:

selecting a game play behavior from a plurality of game play behaviors that can be executed by the player characters in response to an input received at the operation device corresponding to the main character;

controlling the main character to perform the selected game play behavior based on an input received at the operation device corresponding to the main character; and controlling the sub-character to perform the selected game play behavior based on an input received at the second operation device.

* * * * *